(12) United States Patent
Maksuta et al.

(10) Patent No.: US 12,415,964 B2
(45) Date of Patent: Sep. 16, 2025

(54) HIGH TEMPERATURE LUBRICANTS FOR MAGNETIC MEDIA HAVING AROMATIC LINKER MOIETY

(71) Applicant: Western Digital Technologies, Inc., San Jose, CA (US)

(72) Inventors: Daniel Demori Maksuta, San Jose, CA (US); Jianming Wen, Pleasanton, CA (US); Charles Cheng-Hsing Lee, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/417,018

(22) Filed: Jan. 19, 2024

(65) Prior Publication Data

US 2025/0236805 A1 Jul. 24, 2025

(51) Int. Cl.
*C10M 105/18* (2006.01)
*C10M 105/06* (2006.01)
(Continued)

(52) U.S. Cl.
CPC .............. *C10M 105/18* (2013.01); *G11B 5/40* (2013.01); *G11B 5/7257* (2020.08);
(Continued)

(58) Field of Classification Search
CPC .............. C10M 105/18; C10M 105/54; C10M 2207/0406; C10M 2211/0425;
(Continued)

(56) References Cited

U.S. PATENT DOCUMENTS

| 8,668,995 B2 | 3/2014 | Shimizu et al. |
| 8,734,966 B2 | 5/2014 | Sagata et al. |
| (Continued) | | |

FOREIGN PATENT DOCUMENTS

| WO | 2019039265 A1 | 2/2019 |
| WO | 2019087548 A1 | 5/2019 |

OTHER PUBLICATIONS

International Search Report and Written Opinion for Application No. PCT/US25/10803, dated May 5, 2025, 11 pages.

*Primary Examiner* — Holly Rickman
*Assistant Examiner* — Linda N Chau
(74) *Attorney, Agent, or Firm* — Gabriel Fitch; LOZA & LOZA, LLP

(57) ABSTRACT

A lubricant for magnetic media according to general formula (I):

$$Rv^1\text{-}Rb^1\text{---}Re^1\text{-}Rc\text{-}Re^2\text{---}Rb^2\text{-}Rv^2 \qquad (I);$$

where Rc is an optionally non-fluorinated divalent linking segment comprising a first at least one anchoring functional group engageable with a protective overcoat of a magnetic recording medium; where each $Re^1$ and $Re^2$ has a rotational energy barrier that is greater than the rotational energy barrier of $CH_2$; where each $Rb^1$ and $Rb^2$ independently is a chain segment comprising at least one of a fluoroalkyl ether moiety, a fluoroalkenyl ether moiety, a perfluoroalkyl ether moiety, a perfluoroalkenyl ether moiety, or a combination thereof; and where each of $Rv^1$ and $Rv^2$, when present, independently each has a second at least one anchoring functional group engageable with the protective overcoat of a magnetic recording medium. —$Re^1$-Rc-$Re^2$— may have the formula:

(Continued)

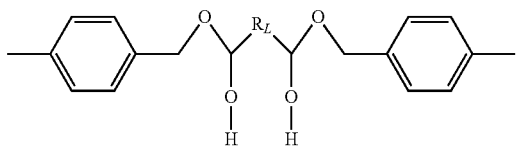

where $R_L$, if present, is $C_nM_2$, wherein M is H, and n is from 1 to 10.

20 Claims, 13 Drawing Sheets

(51) Int. Cl.
  *G11B 5/40* (2006.01)
  *G11B 5/725* (2006.01)
  *C10N 20/00* (2006.01)
  *C10N 30/08* (2006.01)
  *C10N 40/18* (2006.01)
  *G11B 5/00* (2006.01)

(52) U.S. Cl.
  CPC .............. *C10M 2207/0406* (2013.01); *C10M 2211/0425* (2013.01); *C10M 2211/063* (2013.01); *C10N 2020/069* (2020.05); *C10N 2030/08* (2013.01); *C10N 2040/18* (2013.01); *G11B 2005/0021* (2013.01)

(58) Field of Classification Search
  CPC .......... C10M 2211/063; C10M 107/38; C10M 2213/043; C08G 65/007; C08G 65/2612; C08G 65/32; C08L 71/00; C10N 2020/04; C10N 2020/069; C10N 2030/06; C10N 2030/08; C10N 2040/18; C10N 2050/08; C10N 2050/023; G11B 2005/0021; G11B 5/012; G11B 5/255; G11B 5/7257
  See application file for complete search history.

(56) References Cited

U.S. PATENT DOCUMENTS

| | | |
|---|---|---|
| 9,090,772 B2 | 7/2015 | Tonelli et al. |
| 9,466,322 B2 | 10/2016 | Deng et al. |
| 9,805,755 B1 | 10/2017 | Yang |
| 9,911,447 B2 | 3/2018 | Sagata |
| 10,442,893 B2 | 10/2019 | Valsecchi et al. |
| 10,766,844 B2 | 9/2020 | Valsecchi et al. |
| 10,947,476 B2 | 3/2021 | Lu et al. |
| 11,308,985 B2 | 4/2022 | Lu et al. |
| 11,572,519 B2 * | 2/2023 | He ................ C08G 65/2612 |
| 11,591,536 B2 | 2/2023 | Monzani et al. |
| 11,898,117 B2 * | 2/2024 | He ........................ G11B 5/255 |
| 2010/0035083 A1 | 2/2010 | Yang et al. |
| 2011/0117386 A1 | 5/2011 | Li et al. |
| 2012/0251843 A1 | 10/2012 | Yan et al. |
| 2014/0141284 A1 | 5/2014 | Yang et al. |
| 2016/0260452 A1 | 9/2016 | Pathem |
| 2017/0260472 A1 | 9/2017 | Sagata et al. |
| 2018/0268853 A1 | 9/2018 | Shimokawa et al. |
| 2021/0246264 A1 | 8/2021 | Fontana et al. |
| 2022/0033582 A1 | 2/2022 | Sagata |
| 2022/0267516 A1 | 8/2022 | Sagata et al. |
| 2022/0282176 A1 | 9/2022 | He et al. |
| 2022/0290066 A1 | 9/2022 | He et al. |
| 2022/0364008 A1 | 11/2022 | Pathem et al. |
| 2023/0038701 A1 | 2/2023 | Honda et al. |

* cited by examiner

450

460

HIGH TEMPERATURE LUBRICANTS FOR MAGNETIC MEDIA HAVING AROMATIC LINKER MOIETY

FIELD

The disclosure relates to lubricants, and more particularly, to high temperature lubricants, which may be used with media configured for magnetic recording, e.g., for Heat Assisted Magnetic Recording (HAMR), that incorporate moieties having high rotational energy barriers into the linker.

INTRODUCTION

Magnetic storage systems, such as a hard disk drive (HDD), are utilized in a wide variety of devices in both stationary and mobile computing environments. Examples of devices that incorporate magnetic storage systems include data center storage systems, desktop computers, portable notebook computers, portable hard disk drives, network storage systems, high definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks generally include two main components, namely, a substrate material that gives it structure and rigidity, and a magnetic media coating that stores the magnetic signals that represent data in a recording layer within the coating. The typical disk drive also includes a read head and a write head, generally in the form of a magnetic transducer which can sense and/or change the magnetic fields stored on the recording layer of the disks. HAMR is a recording technique that can increase the areal density capability (ADC) of written data on a magnetic storage medium having very high coercivity with high-temperature assistance. However, the high recording temperatures applied to the media may present challenges. Other examples of magnetic storage media include flexible tape media usable for magnetic tape recording.

As a result of the high temperatures associated with HAMR technology, suitable lubricants for use in HAMR media may benefit from high thermal stability. In addition, the higher temperatures also increase the presence of contaminants which may negatively affect data storage. As such, there is a need in the art for high temperature lubricants having properties suitable for use in HAMR drives, including the ability to sequester and/or remove contaminants prior to the contaminants interfering with data storage or other operational processes.

SUMMARY

In one aspect, this disclosure provides a lubricant comprising a plurality of segments according to general formula (I):

$$Rv^1\text{-}Rb^1\text{—}Re^1\text{-}Rc\text{-}Re^2\text{—}Rb^2\text{-}Rv^2 \qquad (I);$$

wherein Rc is a non-fluorinated divalent linking segment comprising at least one least one first anchoring functional group engageable with a protective overcoat of a magnetic recording medium; wherein each $Re^1$ and $Re^2$ is a moiety having as rotational energy barrier that is greater than the rotational energy barrier of $CH_2$; wherein each $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and wherein each of $Rv^1$ and $Rv^2$, when present, independently comprises a moiety having at least one second anchoring functional group engageable with the protective overcoat of the magnetic recording medium.

In one aspect, the lubricant described above wherein the at least one first and second anchoring functional groups each comprises at least one of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

In one aspect, the lubricant described above wherein the at least one first and second anchoring functional groups each comprises at least one of —OH, —NH$_2$, —NH—CO—H, —O—CO—H, —CO—O—H, —SeH, —TeH, —PH$_2$, —PO—(OH)$_2$, —O—PO—(OH)$_2$, —N=P(NH$_2$)$_3$, —AsH$_2$, —SH, —SO$_2$—(OH)$_2$, —BH$_2$, —SiH$_3$, —(CH$_2$)$_q$—SiH$_3$, —(CF$_2$)$_q$—SiH$_3$, or a combination thereof.

In one aspect, the lubricant described above wherein the at least one first and second anchoring functional groups each comprises a hydroxyl (—OH) moiety.

In one aspect, the lubricant described above wherein $Re^1$ and $Re^2$ each independently comprise —CF$_2$—, —NH—, C=NH, C=NHCH$_3$, —N=N—, —O—HP=O—O—, —SiH$_2$—, Si(C$_6$H$_6$)$_2$— or at least one aromatic ring is selected from the group consisting of anisole, benzene, naphthalene, anthracene, phenanthrene, dibenz[a,h,]anthracene, pyrene and benzopyrene.

In one aspect, the lubricant described above wherein —$Re^1$-Rc-$Re^2$— comprises 2 aromatic rings separated by a non-fluorinated linking segment to which the at least one anchoring functional group is attached.

In one aspect, the lubricant described above wherein —$Re^1$-Rc-$Re^2$— comprises 2 aromatic rings separated by a non-fluorinated linking segment containing at least one ether moiety to which the at least one anchoring functional group is attached.

In one aspect, the lubricant described above wherein —$Re^1$-Rc-$Re^2$— comprises:

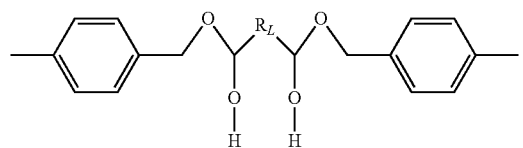

where $R_L$, if present, is $C_nM_{n+2}$, wherein M is H or F, and n is from 1 to 10.

In one aspect, the lubricant described above wherein —Re¹-Rc-Re²— comprises:

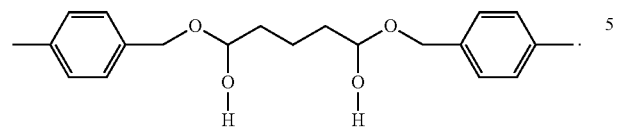

In one aspect, the lubricant described above wherein $Rb_1$ and $Rb_2$ comprises general formula (II):

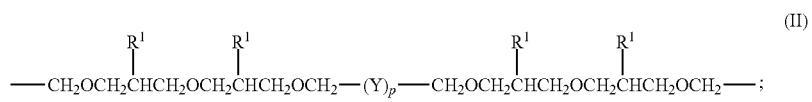

wherein each Y independently comprises:
(i) —$CH_2$—;
(ii) —$CF_2$—;
(iii) —CHF—;
(iv) —$CF_2CF_2CF_2O(CF_2CF_2CF_2CF_2O)_aCF_2CF_2CF_2$—;
(v) —$CF_2CF_2O(CF_2CF_2CF_2O)_aCF_2CF_2$—;
(vi) —$CF_2CF_2O[CF(CF_3)CF_2O]_aCF_2CF_2$—;
(vii) —$CF_2O(CF_2CF_2O)_a(CF_2O)_bCF_2$—;
(viii) —$CF_2O(CF_2CF_2O)_aCF_2$—;
or a combination thereof;
wherein each a, when present, is independently from 1 to 20,
wherein each b, when present, is independently from 1 to 20;
wherein p is from 1 to 20; and
wherein each at least one $R^1$ is H or an anchoring functional group engageable with a protective overcoat of a magnetic recording medium, comprising B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

In one aspect, the lubricant described above which comprises:

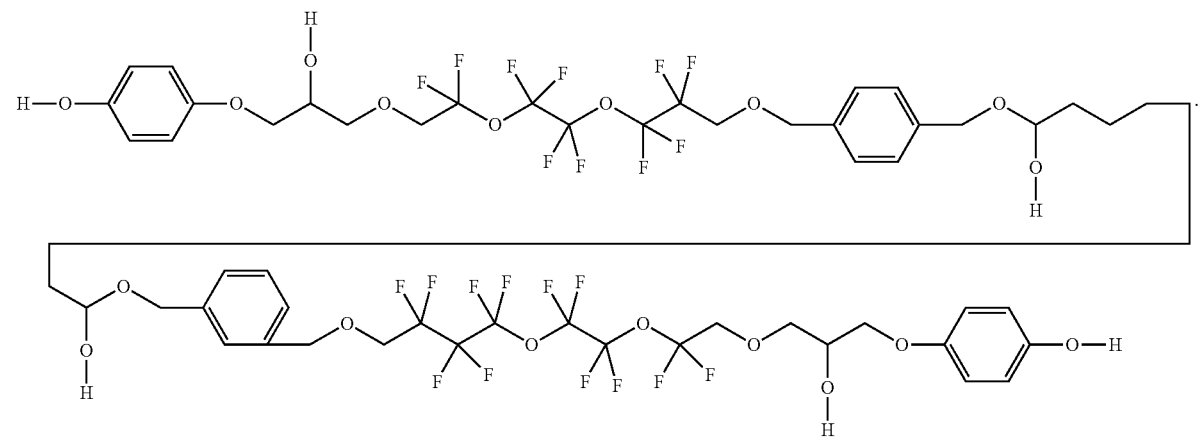 [SMILES: Oc1ccc(OCC(O)COCC(F)(F)OC(F)(F)C(F)(F)OC(F)(F)C(F)(F)COCc2ccc(COC(O)CCCCCCCC(O)OCc3cccc(COCC(F)(F)C(F)(F)C(F)(F)OC(F)(F)C(F)(F)OC(F)(F)COCC(O)COc4ccc(O)cc4)c3)cc2)cc1]

In one aspect, a magnetic recording medium, comprising: a magnetic recording layer on a substrate; a protective overcoat on the magnetic recording layer; and a lubricant layer comprising the lubricant described above on the protective overcoat.

In one aspect, the magnetic recording medium described above, wherein the lubricant has a uniformity of about 0.2 to 0.3 Å at a lubricant thickness of between about 6 to 10 Å.

In one aspect, a data storage system, comprising: at least one magnetic head; a magnetic recording medium including the lubricant of claim 1; a drive mechanism for positioning the at least one magnetic head over the magnetic recording medium; and a controller electrically coupled to the at least one magnetic head for controlling operation of the at least one magnetic head.

In one aspect, a data storage system, comprising: a slider comprising at least one magnetic head and an air bearing surface (ABS), wherein a lubricant according to claim 1 is disposed on the ABS; and a magnetic recording medium including a magnetic recording layer; wherein the slider is configured to write information to the magnetic recording layer using heat assisted magnetic recording (HAMR).

In one aspect, a lubricant comprising a plurality of segments according to general formula (I):

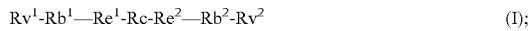

$$Rv^1\text{-}Rb^1\text{—}Re^1\text{-}Rc\text{-}Re^2\text{—}Rb^2\text{-}Rv^2 \quad (I);$$

wherein Rc is a non-fluorinated divalent linking segment comprising at least one first anchoring functional group engageable with a protective overcoat of a magnetic recording medium; wherein each $Re^1$ and $Re^2$ is an aromatic ring; wherein each $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and wherein each of $Rv^1$ and $Rv^2$, when present, independently comprises a moiety having at least one second anchoring functional group engageable with the protective overcoat of the magnetic recording medium.

In one aspect, the lubricant described above wherein the at least one first and second anchoring functional groups each comprises at least one of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

In one aspect, the lubricant described above wherein the at least one first and second anchoring functional groups each comprises at least one of —OH, —NH$_2$, —NH—CO—H, —O—CO—H, —CO—O—H, —SeH, —TeH, —PH$_2$, —PO—(OH)$_2$, —O—PO—(OH)$_2$, —N=P(NH$_2$)$_3$, —AsH$_2$, —SH, —SO$_2$—(OH)$_2$, —BH$_2$, —SiH$_3$, —(CH$_2$)$_q$—SiH$_3$, —(CF$_2$)$_q$—SiH$_3$, or a combination thereof.

In one aspect, the lubricant described above wherein the at least one first and second anchoring functional groups each comprises a hydroxyl (—OH) moiety.

In one aspect, the lubricant described above wherein $Re^1$ and $Re^2$ each independently comprise at least one aromatic ring selected from the group consisting of: anisole, benzene, naphthalene, anthracene, phenanthrene, dibenz[a,h]anthracene, pyrene and benzopyrene.

Other aspects and advantages of the present disclosure will become apparent from the following detailed description and examples, when considered in conjunction with the drawings.

DETAILED DESCRIPTION

Figure 1A:
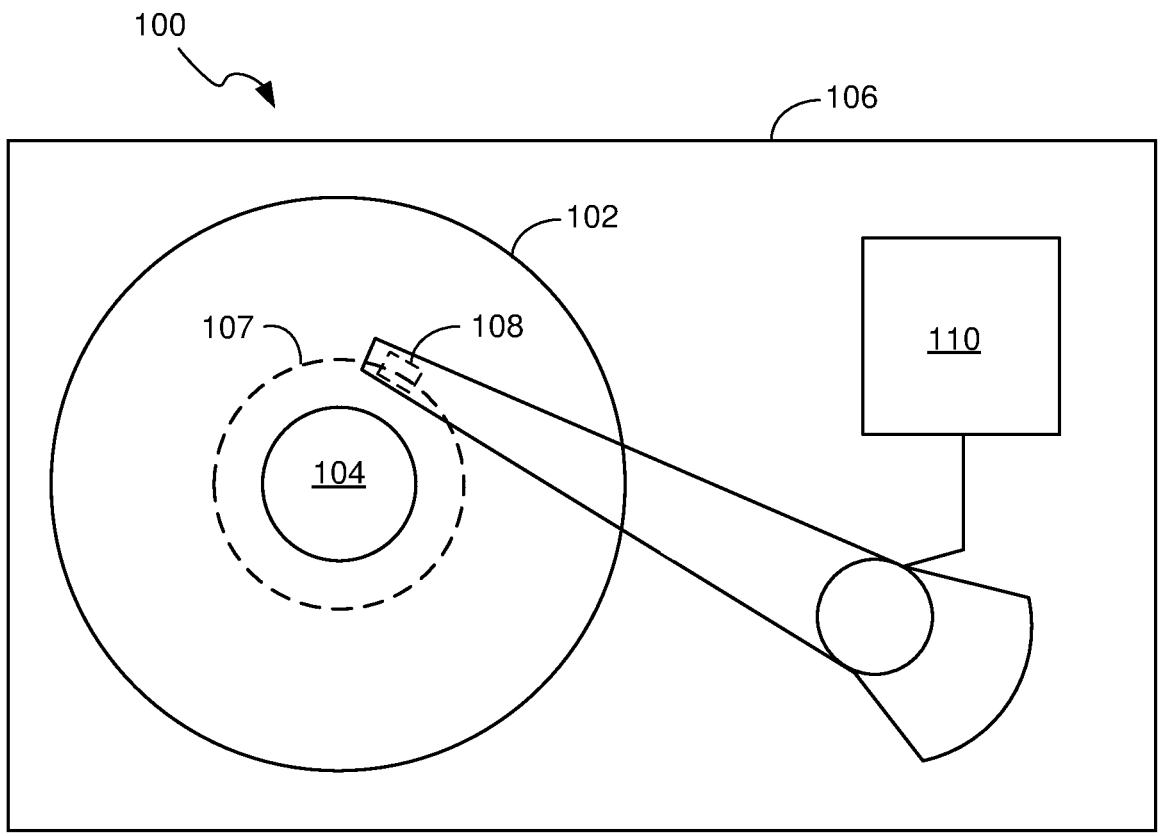
FIG. 1A is a diagram schematically illustrating a data storage device including a slider and a magnetic recording medium in accordance with one aspect of the disclosure.

Heat Assisted Magnetic Recording (HAMR) systems operate at substantially higher temperatures than traditional magnetic recording systems. HAMR is an example of magnetic recording within the class of Energy Assisted Magnetic Recording (EAMR) techniques, where conventional magnetic recording is supplemented by other energy used in the system. Other examples of EAMR may include Microwave Assisted Magnetic Recording (MAMR) and applications of electric current into various conductive and/or magnetic structures near the main pole. This disclosure is generally directed to lubricants having high thermal stability that can be used in conjunction with a magnetic recording medium and/or a magnetic data storage system including a HAMR, or more generally EAMR, magnetic recording medium or storage system.

In short, the disclosure pertains to lubricants with a stiffened central linker obtained by modulating the rotational energy of the central linker.

In one aspect, one such lubricant comprises or is according to general formula (I):

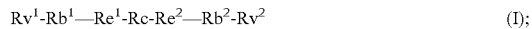

$Rv^1\text{-}Rb^1\text{—}Re^1\text{-}Rc\text{-}Re^2\text{—}Rb^2\text{-}Rv^2$ (I);

where Rc is an optionally non-fluorinated divalent linking segment having at least one first anchoring functional group engageable with a protective overcoat of a magnetic recording medium. That is, Rc is a flexible segment formed from $CH_2$—$CH_2$ bonds or bonds of lower rotational energy barrier (i.e., —$CH_2$—O) and may contain a first at least one anchoring functional group engageable with a protective overcoat of a magnetic recording medium. Each $Re^1$ and $Re^2$ is a moiety having as rotational energy barrier that is greater than the rotational energy barrier of $CH_2$; where each $Rb^1$ and $Rb^2$ independently is a chain segment having at least one of a fluoroalkyl ether moiety, a fluoroalkenyl ether moiety, a perfluoroalkyl ether moiety, a perfluoroalkenyl ether moiety, or a combination thereof. Each of $Rv^1$ and $Rv^2$, when present, independently is a moiety having a second at least one anchoring functional group engageable with the protective overcoat of a magnetic recording medium.

The side chain segments may terminate with one of the end group segments, $Rv^1$ and $Rv^2$. Each end group segment, $Rv^1$ and $Rv^2$, includes the second at least one anchoring functional group which is selected to be attachable and/or engageable with a protective overcoat of a magnetic recording medium.

The center or linking segment $Re^1$-Rc-$Re^2$— may also include the first at least one anchoring functional group which is selected to be attachable and/or engageable with a protective overcoat of a magnetic recording medium, a moiety having as rotational energy barrier that is greater than the rotational energy barrier of $CH_2$, which optionally includes at least one aromatic functional group comprising at least one of benzene, naphthalene, anthracene, phenanthrene, dibenz[a,h]anthracene, pyrene and benzopyrene.

The multi-dentate structure of the lubricant provides improved levels of head wear, lube pickup, and other properties including improved mechanical integration robustness. The presence of groups having a rotational energy barrier that is greater than the rotational energy barrier of $CH_2$ (e.g., aromatic groups, the aromatic functional groups) increases thermal stability and reduces the contamination vulnerability when compared with lubricants known in the art.

Definitions

For purposes herein, and the claims thereto, the new numbering scheme for the Periodic Table Groups is used as described in Chemical and Engineering News, 63(5), pg. 27 (1985). Therefore, a "group 4 metal" is an element from group 4 of the Periodic Table, e.g. Hf, Ti, or Zr.

As used herein, and unless otherwise specified, the term "$C_n$" means hydrocarbon(s) having n carbon atom(s) per molecule, where n is a positive integer. Likewise, a "$C_m$-$C_y$" group or compound refers to a group or compound comprising carbon atoms at a total number thereof in the range from m to y. Thus, a $C_1$-$C_4$ alkyl group refers to an alkyl group that includes carbon atoms at a total number thereof in the range of 1 to 4, e.g., 1, 2, 3 and 4.

"Moiety" refers to one or more covalently bonded atoms which form a part of a molecule. The terms "group," "radical," "moiety", and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{50}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

For purposes herein, a "heteroatom" is any non-carbon atom, selected from groups 13 through 17 of the periodic table of the elements. In one or more aspects, heteroatoms are non-metallic atoms selected from B, Si, pnictogens (N, P, As, Sb, Bi), chalcogen (O, S, Se, Te), and halogens (F, Cl, Br, I).

Unless otherwise indicated, the term "substituted" means that at least one hydrogen atom has been replaced with at least one non-hydrogen atom or a functional group.

For purposes herein, when a segment comprises or includes a particular moiety, it is to be understood that the moiety may be bonded to the respective segment at any substitutable position in which a hydrogen atom may be replaced with a chemical bond between the moiety and the segment.

For purposes herein, a functional group includes one or more of a hydrocarbyl group, a heteroatom, or a heteroatom containing group, such as B, Si, pnictogen, chalcogen, or halogen (such as Br, Cl, F or I), at least one of —OR*, —NR*$_2$, —NR*—CO—R*, —OR*, R*—O—CO—R*, —CO—O—R*, —SeR*, —TeR*, —PR*$_2$, —PO—(OR*)$_2$, —O—PO—(OR*)$_2$, —AsR*$_2$, —SbR*$_2$, —SR*, —SO$_2$—(OR*)$_2$, —BR*$_2$, —SiR*$_3$, —(CH$_2$)$_q$—SiR*$_3$, or a combination thereof, wherein q is 1 to 10 and each R* is independently a hydrogen, a hydrocarbyl or a halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring. In an aspect, R* is H such that the functional group may be —OH, —NH$_2$, —NH—CO—H, —OH, H—O—CO—H, —CO—O—H, —SeH, —TeH, —PH$_2$, —PO—(OH)$_2$, —O—PO—(OH)$_2$, —AsH$_2$, —SbH$_2$, —SH, —SO$_2$—(OH)$_2$, —BH$_2$, —SiH$_3$, —(CH$_2$)$_q$—SiH$_3$, or a combination thereof.

In one or more aspects, functional groups may include: a saturated $C_1$-$C_{50}$ radical, an unsaturated $C_1$-$C_{50}$ radical, an alicyclic $C_3$-$C_{50}$ radical, a heterocyclic $C_3$-$C_{50}$ radical, an aromatic $C_5$-$C_{50}$ radical, a heteroaromatic $C_5$-$C_{50}$ radical, a cyclotriphosphazine radical, a B, Si, pnictogen, chalcogen, or halogen, —OR*, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently a hydrogen, a pnictogen, a chalcogen, a halogen, or a saturated, unsaturated, aromatic, polycyclic aromatic, heteroaromatic, alicyclic, and/or heterocyclic $C_4$-$C_{50}$ radical. Anchoring functional groups can also be least one of —OH, —NH$_2$, —NH—CO—H, —O—CO—H, —CO—O—H, —SeH, —TeH, —PH$_2$, —PO—(OH)$_2$, —O—PO—(OH)$_2$, —N=P(NH$_2$)$_3$, —AsH$_2$, —SH, —SO$_2$—(OH)$_2$, —BH$_2$, —SiH$_3$, —(CH$_2$)$_q$—SiH$_3$, —(CF$_2$)$_q$—SiH$_3$, or a combination thereof.

For purposes herein, a cyclic functional group is a monovalent alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof. Unless otherwise indicated, the cyclic functional group may be further substituted with another cyclic functional group and/or with one or more functional groups comprising one or more of a saturated $C_1$-$C_{50}$ radical, an unsaturated $C_1$-$C_{50}$ radical, an alicyclic $C_3$-$C_{50}$ radical, a heterocyclic $C_3$-$C_{50}$ radical, an aromatic $C_5$-$C_{50}$ radical, a heteroaromatic $C_5$-$C_{50}$ radical, a cyclotriphosphazine radical, B, Si, a pnictogen, a chalcogen, or a halogen, —OR*, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently a hydrogen, a pnictogen/chalcogen/halogen, or a saturated, unsaturated, aromatic, polycyclic aromatic, heteroaromatic, alicyclic, and/or a heterocyclic $C_1$-$C_{50}$ radical.

For purposes as described herein, an anchoring functional group which is selected for being attachable to and/or engageable with a protective overcoat of a magnetic recording medium refers to a functional group having increased affinity for the protective overcoat of a magnetic recording medium relative to the affinity of a fluoroalkenyl ether moiety, a perfluoroalkyl ether moiety, a perfluoroalkenyl ether moieties, to that same surface. Increased affinity may include Van der Waals forces, weak London Dispersion forces, dipole-dipole forces, polar interactions, polarizability/hydrogen bonding interactions, and/or the like, and/or may include the formation of one or more types of bonds, backbonding, and/or dative bonds with the protective overcoat of a recording medium. In one or more aspects, a functional group which is attachable to and/or engageable with a protective overcoat of a magnetic recording medium refers to one or more functional groups having increased affinity for the carbon overcoat (COC) layer of the recording medium, relative to the affinity of a fluoroalkenyl ether moiety, a perfluoroalkyl ether moiety, a perfluoroalkenyl ether moieties to that same surface. In some aspects, functional groups attachable to and/or engageable with a protective overcoat of a magnetic recording medium include radicals comprising one or more hydroxyl moieties (—OH), or consisting of a hydroxyl moiety (—OH).

A "heterocyclic ring," also referred to herein as a heterocyclic radical, is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring. A substituted heterocyclic ring is a heterocyclic ring where a hydrogen of one of the ring atoms is substituted, e.g., replaced with a hydrocarbyl, or a heteroatom containing group.

A "compound" refers to a substance formed by the chemical bonding of a plurality chemical elements. A "derivative" refers to a compound in which one or more of the atoms or functional groups of a precursor compound have been replaced by another atom or functional group, generally by means of a chemical reaction having one or more steps.

Fluorinated alkyl ethers including fluoroalkyl ethers, fluoroalkenyl ethers, perfluoroalkyl ethers, perfluoroalkenyl ethers, or combinations thereof, refer to branched or linear chain of $C_1$ to $C_{20}$ alkyl ethers in which one or more hydrogen atoms are substituted with fluorine. In one aspect, all or a majority of alkyl hydrogen atoms are substituted with fluorine.

For any particular compound disclosed herein, any general or specific structure presented also encompasses all conformational isomers, regio-isomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

As used herein, the term "aromatic" also refers to pseudo-aromatic heterocycles which are heterocyclic substituents that have similar properties and structures (nearly planar) to aromatic heterocyclic ligands, but are not by definition aromatic; likewise the term aromatic also refers to substituted aromatics.

As used herein, a moiety which is chemically identical to another moiety is defined as being identical in overall composition exclusive of isotopic abundance and/or distribution, and/or exclusive of stereochemical arrangement such as optical isomers, confirmational isomers, spatial isomers, and/or the like.

HAMR System for Employing Lubricant

FIG. 1A is a top schematic view of a data storage device 100 (e.g., disk drive or magnetic recording device) configured for heat assisted magnetic recording (HAMR) including a slider 108 and a magnetic recording medium 102 having a lubricant according to one or more aspects of the disclosure. The laser (not visible in FIG. 1A but see 114 in FIG. 1B) is positioned with a head/slider 108. Disk drive 100 may include one or more disks/media 102 to store data. The disks/media 102 reside on a spindle assembly 104 that is mounted to a drive housing. Data may be stored along tracks in the magnetic recording layer of disk 102. The reading and writing of data is accomplished with the head 108 (slider) that may have both read and write elements (108a and 108b). The write element 108a is used to alter the properties of the magnetic recording layer of disk 102 and thereby write information thereto. In one aspect, head 108 may have magneto-resistive (MR), giant magneto-resistive (GMR), or tunnel magneto-resistive (TMR) elements. In an alternative aspect, head 108 may be another type of head, for example, a Hall effect head. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an example HAMR system is shown, the various embodiments described may be used in other EAMR or non-EAMR magnetic data recording systems, including perpendicular magnetic recording (PMR) disk drives or magnetic tape drives.

Figure 1B:
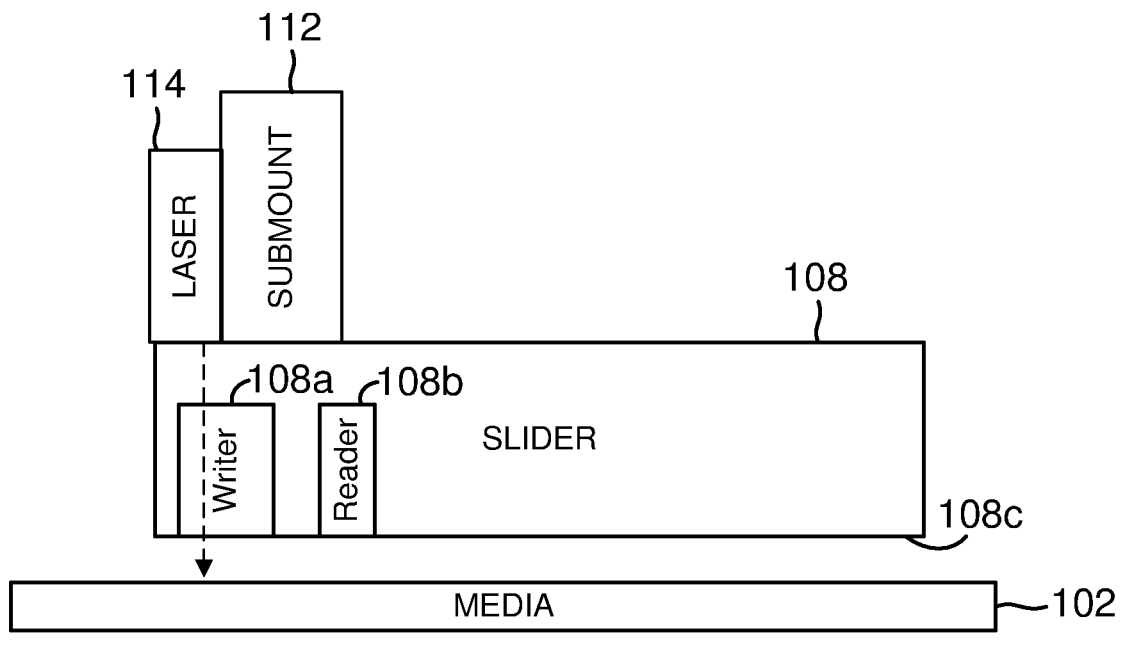
FIG. 1B is a side schematic view of the slider and magnetic recording medium of FIG. 1A in accordance with one aspect of the disclosure.

FIG. 1B is a side schematic view of the slider 108 and magnetic recording medium 102 of FIG. 1A. The magnetic recording medium 102 includes a lubricant layer (see FIG. 2) in accordance with one or more aspects of the disclosure. The slider 108 may include a sub-mount 112 attached to a top surface of the slider 108. The laser 114 may be attached to the sub-mount 112, and possibly to the slider 108. The slider 108 includes a write element (e.g., writer) 108a and a read element (e.g., reader) 108b positioned along an air bearing surface (ABS) 108c of the slider for writing information to, and reading information from, respectively, the medium 102. In other aspects, the slider may also include a layer of the lubricant (not shown).

In operation, the laser 114 is configured to generate and direct light energy to a waveguide (possibly along the dashed line) in the slider which directs the light to a near field transducer (NFT) near the air bearing surface (e.g., bottom surface) 108c of the slider 108. Upon receiving the light from the laser 114 via the waveguide, the NFT generates localized heat energy that heats a portion of the medium 102 near the write element 108a and the read element 108b. The anticipated recording temperature is in the range of about 350° C. to 400° C. In the aspect illustrated in FIG. 1B, the laser directed light is disposed between the writer 108a and a trailing edge of the slider. In other aspects, the laser directed light may instead be positioned between the writer 108a and the reader 108b. FIGS. 1A and 1B illustrate a specific aspect of a HAMR system. In other aspects, the magnetic recording medium 102 with the lubricant layer according to aspects of the disclosure can be used in other suitable HAMR systems (e.g., with other sliders configured for HAMR).

Figure 2:
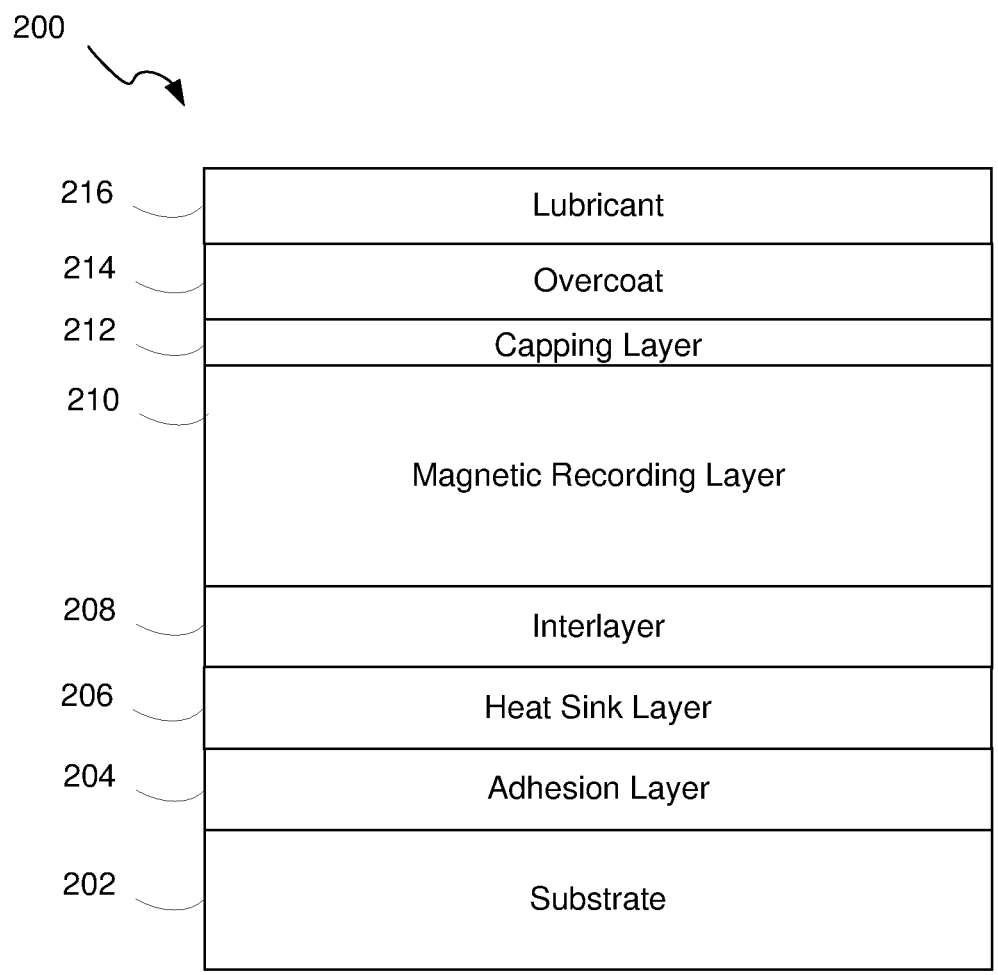
FIG. 2 is a side schematic view of a head assisted magnetic recording (HAMR) medium in accordance with one aspect of the disclosure.

FIG. 2 is a side schematic view of a magnetic recording medium 200 having a lubricant layer according to one or more aspects of the disclosure. In one aspect, the magnetic recording medium 200 may be used in a HAMR system (e.g., disk drive 100). The magnetic recording medium 200 has a stacked structure with a substrate 202 at a bottom/base layer, an adhesion layer 204 on the substrate 202, a heat sink layer 206 on the adhesion layer 204, an interlayer 208 on the heat sink layer 206, a magnetic recording layer (MRL) 210 on the interlayer 208, a capping layer 212 on the MRL 210, an overcoat layer 214 on the capping layer 212, and a lubricant layer 216 on the overcoat layer 214. In one aspect, the magnetic recording medium 200 may have a soft magnetic underlayer (SUL) between the adhesion layer 204 and the heat sink layer 206. In one aspect, the magnetic recording medium 200 may have a thermal resistance layer (TRL) between the interlayer 208 and the heat sink layer 206. In one aspect, for disk drive applications, the substrate 202 can be made of one or more materials such as an Al alloy, NiP plated Al, glass, glass ceramic, and/or combinations thereof. In one aspect for magnetic tape recording applications, the substrate 202 can include a flexible material, such a film made of one of various types of resins, polyesters, polyolefins, polyamides, and the like, or combinations thereof. The substrate may include non-magnetic materials, and may be laminated. In some aspects, the magnetic recording medium 200 may have some or all of the layers illustrated in FIG. 2 and/or additional layer(s) in various stacking orders. It should also be noted that each layer shown in FIG. 2 may include one or more sub-layers. For example, the magnetic recording layer may comprise a multiple layers in certain embodiments. Also, some of the layers may be etched before the next layer is applied.

Lubricants

Lubricants according to aspects disclosed herein may function as boundary lubricants which may be used in various mechanical devices, including on the magnetic media of hard disk drives or tape drives and in conjunction with other microelectronic mechanical systems. Boundary lubricants may form a lubricant layer when one or more functional groups of the lubricant attach or otherwise engage with the surface being lubricated. For instance, one or more boundary lubricants may form the lubricant layer 216 on magnetic recording medium 200 (e.g., a disk that includes a magnetic recording layer 210) that moves relative to other parts in the magnetic storage device. This lubricant layer 216 may help to protect the magnetic recording medium from friction, wear, contaminations, smearing, and/or damages caused by interactions between the magnetic recording medium and other parts in the storage device (e.g., interactions between a slider and the magnetic recording medium). In other words, this boundary layer may help limit solid-to-solid contact.

Lubricant Characteristics

Figure 3A:
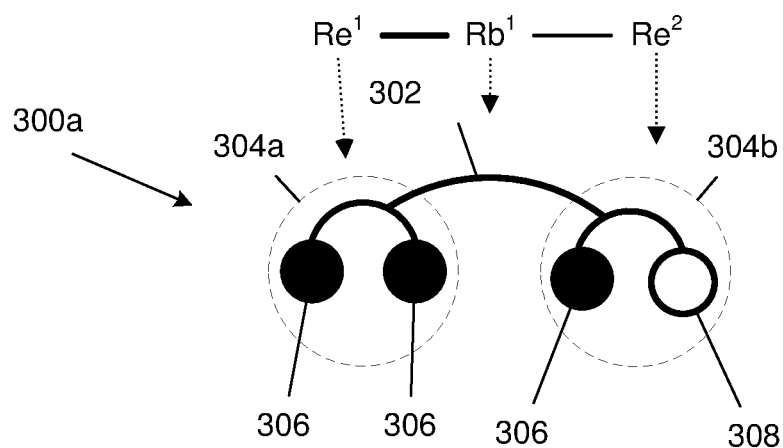
FIG. 3A is a schematic drawing showing a lubricant according to general formula (II) of the disclosure comprising a single main chain segment and a cyclic functional group according to one aspect of the disclosure.

FIG. 3A-3D illustrate boundary lubricants according to aspects of the disclosure. In one aspect as shown in FIG. 3A, the boundary lubricant generally referred to as 300a comprises or may have general formula (II):

$$\text{Re}^1\text{—Rb}^1\text{—Re}^2 \quad\quad\quad (II);$$

wherein $Rb^1$ (302) comprises or is a chain segment including an alkyl, alkenyl, fluoroalkyl, fluoroalkenyl, perfluoroalkyl, or perfluoroalkyl ether moiety bonded on either side to an end segment 304a and 304b. $Rb^1$ may be non-fluoridated, contain anchoring functional groups and contain aromatic, e.g., benzene, rings. $Rb^1$ may also have a stiffening component that has a higher rotational energy than $CH_2$. In the aspect shown in FIG. 3A, the chain segment $Rb^1$ (302) may be also be referred to as a main chain segment. Each of $Re^1$ (304a) and $Re^2$ (304b) is an end segment which independently includes an anchoring functional group 306 selected for being attachable to and/or engageable with a protective overcoat of a magnetic recording medium (see FIG. 2).

Figure 3B:
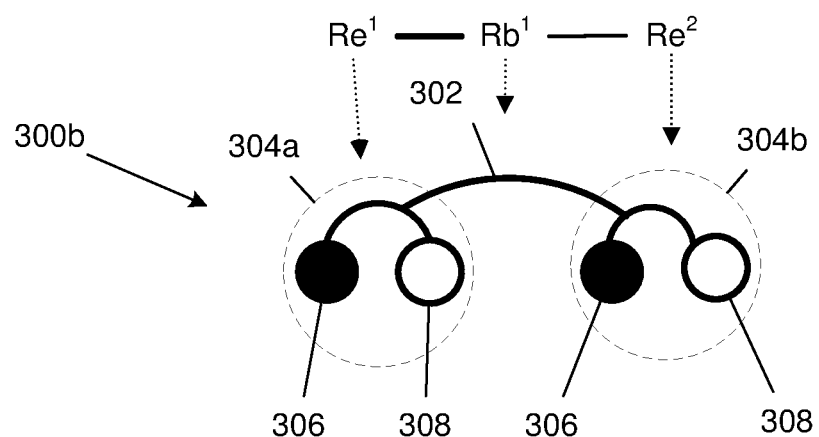
FIG. 3B is a schematic drawing showing a lubricant according to general formula (II) of the disclosure comprising a single main chain segment and a multitude of cyclic functional groups according to one aspect of the disclosure.

As shown in FIG. 3B, in one aspect indicated as 300b, each end group segment may include a functional group 308 that can be as simple as an —OH group.

Figure 3C:
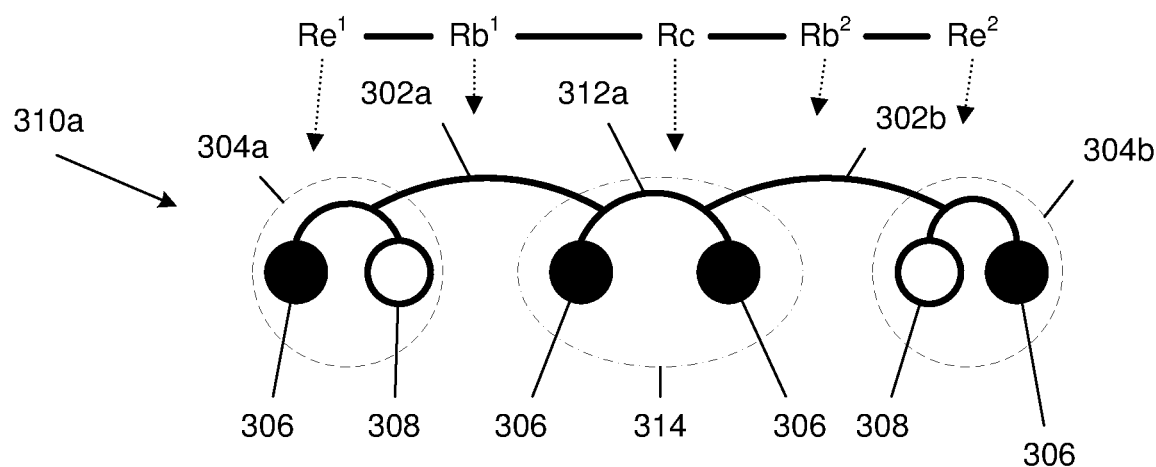
FIG. 3C is a schematic drawing showing a lubricant according to general formula (III) of the disclosure comprising two chain segments comprising terminal cyclic functional groups and separated by a linking segment according to one aspect of the disclosure.

In one aspect as shown in FIG. 3C, the boundary lubricant generally referred to as 310a may comprise or has general formula (III):

$$\text{Re}^1\text{—Rb}^1\text{-Rc-Rb}^2\text{—Re}^2 \quad\quad\quad (III);$$

where the end segments $Re^1$ (304a) and $Re^2$ (304b) are as described above; in this aspect there are two chain segments $Rb^1$ (302a) and $Rb^2$ (302b), which may also be referred to herein as sidechain segments, both of which independently comprises a fluoroalkyl, fluoroalkenyl, perfluoroalkyl, or perfluoroalkyl ether moiety.

As is indicated in FIG. 3C, whether referred to as a chain segment, a main chain segment (when only one is present), or a sidechain segment (when two or more are present), each of the segments are similar to one another in that each segment comprises an alkyl, alkenyl, fluoroalkyl, fluoroalkenyl, perfluoroalkyl, or perfluoroalkyl ether moiety.

In the aspect shown in FIG. 3C, the lubricant may further include a divalent linking segment Rc (312), generally indicated as 314, also referred to herein as a center segment, which is disposed between either end of the sidechain segments 302a and 302b, and which includes at least one anchoring functional group (306) as defined herein, as well as at least one group that has a higher rotational energy than $CH_2$, which for example can be an aromatic group, e.g., benzene. In an embodiment, Rc is non-fluorinated. The divalent linking segment optionally includes aromatic moieties which act to stiffen the center of the molecule. The aromatic moieties, e.g., benzene, impact both the chain stiffness and solubility differently than fluorination.

Figure 3D:
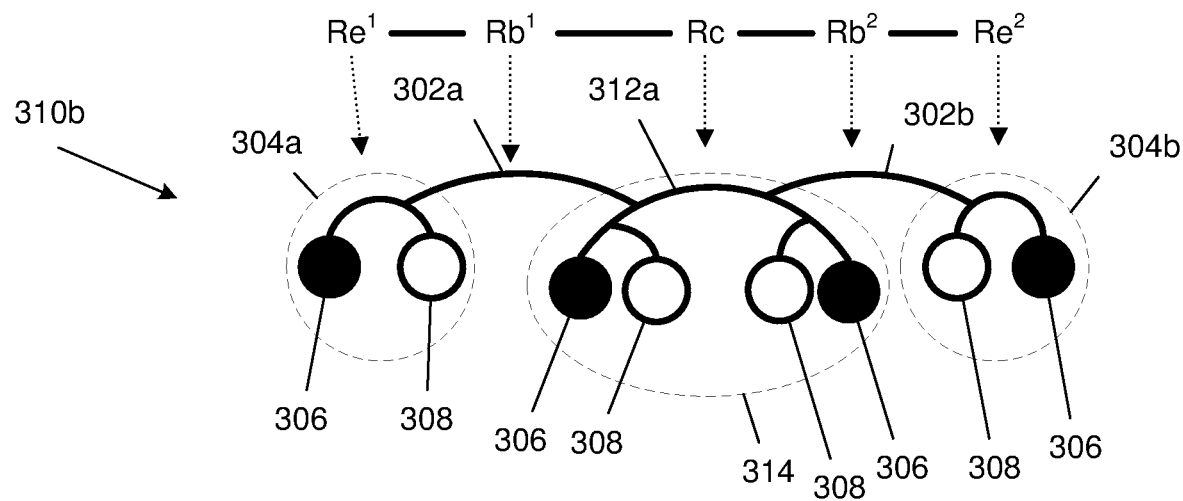
FIG. 3D is a schematic drawing showing a lubricant according to general formula (III) of the disclosure comprising two chain segments comprising terminal cyclic functional groups and separated by a linking segment comprising cyclic functional groups according to one aspect of the disclosure.

As shown in FIG. 3D, in one aspect generally indicated as 310b, the divalent linking segment Rc (312) may further include at least one functional group 308 as defined herein.

Figure 3E:
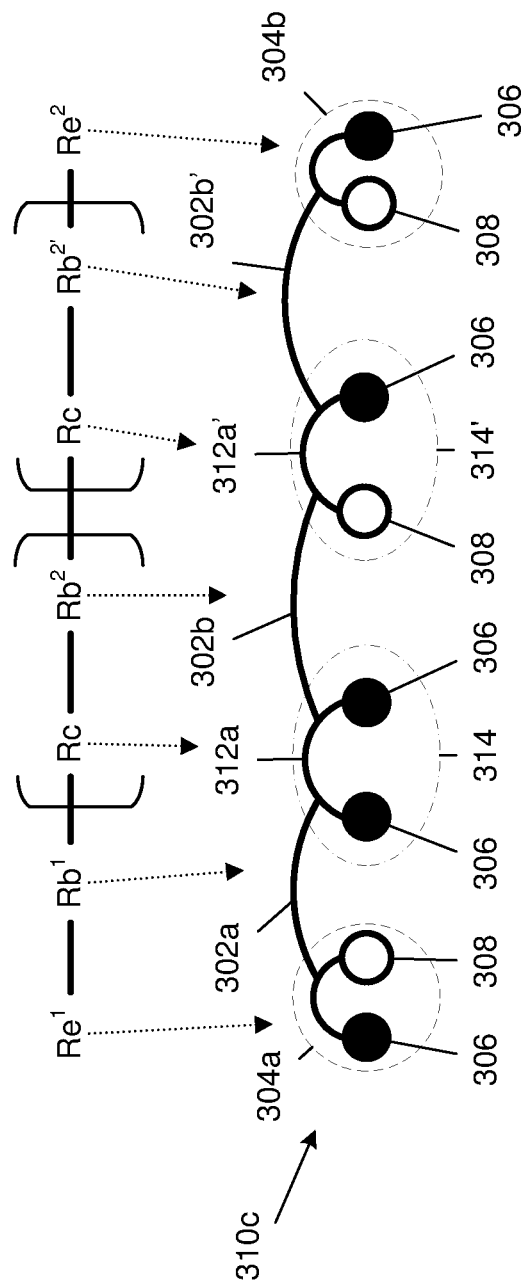
FIG. 3E is a schematic drawing showing a lubricant according to general formula (IV) of the disclosure comprising two chain segments comprising terminal cyclic functional groups and separated by a linking segment according to one aspect of the disclosure.

In one aspect as shown in FIG. 3E, the boundary lubricant generally referred to as 310c may comprise or has general formula (IV):

$$Re^1-Rb^1\text{-}(Rc\text{-}Rb^2)_m-Re^2 \qquad (IV);$$

wherein m=2, comprising two units of the divalent linking segments, each containing an aromatic moiety or a moiety that has a higher rotational energy than $CH_2$; a first unit comprising Rc (312a) also generally indicated as (314), attached to a chain segments $Rb^2$ (302b), which is attached to a second unit comprising Rc (312a') also generally indicated as (314') and a second chain segment $Rb^{2'}$ (302b'). The second unit includes a moiety that has a rotational energy barrier that is greater than that of $CH_2$. The end segments $Re^1$ (304a) and $Re^2$ (304b) are attached to ether end of the molecule. The composition of each of the segments may be independent of one another. The composition of each of the segments is according to the description of general formula (I) herein. In an embodiment, Rc contains at least one anchoring functional group, is non-fluorinated and contains at least one aromatic constituent, e.g., a benzene ring. In an embodiment, Rc contains two aromatic constituents.

In one aspect, each anchoring functional group may independently comprises a B, Si, pnictogen, chalcogen, or halogen, —OR*, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently a hydrogen, a pnictogen/chalcogen/halogen, or a saturated, unsaturated, aromatic, polycyclic aromatic, heteroaromatic, alicyclic, and/or heterocyclic $C_1$-$C_{50}$ radical, and two or more R* may join together to form a ring structure. Frequently, the anchoring functional group may be hydroxyl (—OH).

In one aspect, each cyclic functional group may further comprise, e.g., may be further substituted with a functional group comprising at least one of a B, Si, pnictogen, chalcogen, or halogen, —OH, —NH$_2$, —NH—CO—H, —OH, —O—CO—H, —CO—O—H, —SeH, —TeH, —PH$_2$, —PO—(OH)$_2$, —O—PO—(OH)$_2$, —N=P(NH$_2$)$_3$, —AsH$_2$, —SH, —SO$_2$—(OH)$_2$, —BH$_2$, —SiH$_3$, —(CH$_2$)$_q$—SiH$_3$, —(CF$_2$)$_q$—SiH$_3$, or a combination thereof, wherein q is 1 to 10.

In one aspect, one or more anchoring functional group may include, or is, a hydroxyl (—OH) moiety. In one aspect, each anchoring functional group includes or is a hydroxyl (—OH) moiety. In some aspects, one or more cyclic functional groups may comprise a hydroxyl (—OH) moiety. In some aspects, each cyclic functional group comprises a hydroxyl (—OH) moiety.

Aromatic Functional Groups

Applicants have discovered that the presence of functional groups having high rotational energy barriers, e.g., aromatic functional groups, in the center of the molecule provide a multifaceted benefit for applications involving higher operational temperatures (e.g., such as HAMR media applications) when the aromatic functional groups are present in the center or linking segment pendant to the chain segments according to aspects disclosed herein. It has been discovered that the aromatic functional groups reduce the contamination present on the magnetic recording medium when operating at high temperatures. The disclosure is not restricted to aromatic groups, and any group that has a higher rotational energy than $CH_2$ will also achieve the molecular stiffening that enhances high temperature performance.

In one aspect, a cyclic aromatic functional group may include substituted or unsubstituted analogs of borirene, cyclopropenone, furan, pyrrole, imidazole, thiophene, phosphole, pyrazole, oxazole, isoxazole, thiazole, triazole, tetrazole, pentazole, benzene, pyridine, pyrazine, pyrimidine, pyridazine, triazine, tetrazine, pentazine, hexazine, borepin, tropone, azonine, cyclooctadecanonaene, diazapentalene, thienothiophene, trithiapentalene, benzofuran, isobenzofuran, indole, isoindole, benzothiophene, benzo(c)thiophene, benzophosphole, benzimidazole, purine, indazole, benzoxazole, benzisoxazole, benzothiazole, 5-aza-7-deazapurine, naphthalene, quinoline, isoquinoline, quinoxaline, quinazoline, cinnoline, phthalazine, azulene, combinations thereof, and/or the like. According to aspects of the disclosure, the aromatic group may be anisole, benzene, naphthalene, anthracene, phenanthrene, dibenz[a,h,]anthracene, pyrene or benzopyrene.

Divalent Linking Segment (Rc)

In one aspect, a lubricant may comprise or have the general formula (I):

$$Rv^1\text{-}Rb^1-Re^1\text{-}Rc\text{-}Re^2-Rb^2\text{-}Rv^2 \qquad (I)$$

where the divalent linking or center segment Rc further includes one or more anchoring functional groups, and/or one or more aromatic functional groups or groups having high rotational energy barriers.

In an aspect, —$Re^1$—Rc-$Re^2$— has the general formula (V):

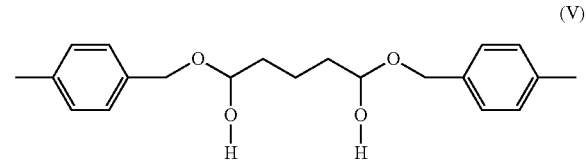

The general formula (V) optionally contains no fluorine. The benzene rings have a higher rotational energy barrier than —$CH_2$— and thus add stiffness an increased temperature resistance to the molecule. The benzene ring can be substituted with any moiety that has a higher rotational energy barrier than —$CH_2$— and can even be a fluorinated species. In a related aspect, at least one aromatic moiety present on the linking segment Re may not be benzene, but may be may be an aromatic functional group including an aromatic $C_5$-$C_{50}$ radical.

In another aspect, —$Re^1$—Rc-$Re^2$— includes or is of general formula (VI):

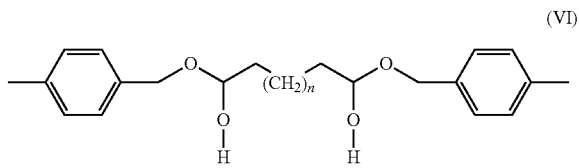

(VI)

where n is from 1 to 10. The general formula (VI) optionally contains no fluorine. The benzene rings have a higher rotational energy barrier than —$CH_2$— and thus add stiffness and increased temperature resistance to the molecule. The benzene ring can be substituted with any moiety that has a higher rotational energy barrier than —$CH_2$— and can even be a fluorinated species. In a related aspect, at least one aromatic moiety present on the linking segment Re may not be benzene, but may be may be an aromatic functional group including an aromatic $C_5$-$C_{50}$ radical.

In another aspect, —$Re^1$—Rc-$Re^2$— includes or is of general formula (VIa):

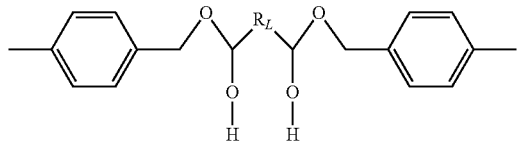

(VIa)

where $R_L$, if present, is $C_nM_{n+2}$, where M is H or F, and n is from 1 to 10.

The molecular design is based on the observation that a non-fluorinated linker shows good lubrication uniformity after dip coating, but does not appear to give any benefit to the evaporation temperature. The addition of fluorine increases the evaporation temperature but causes poor lubrication uniformity after dip coating. A redesigned linker with the inclusion of an aromatic moiety, such as at least one benzene ring, improves the dip coating uniformity relative to the fluorinated versions and substantially increases the evaporation temperature, as can be seen in the following structures:

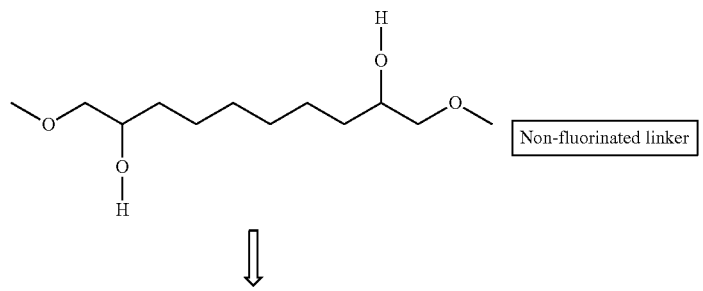

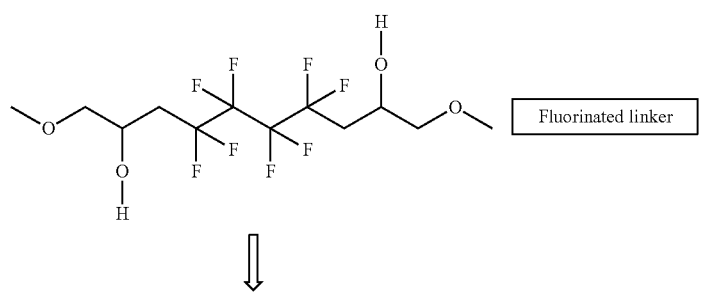

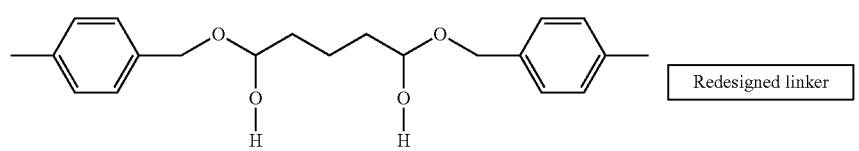

Figure 5:
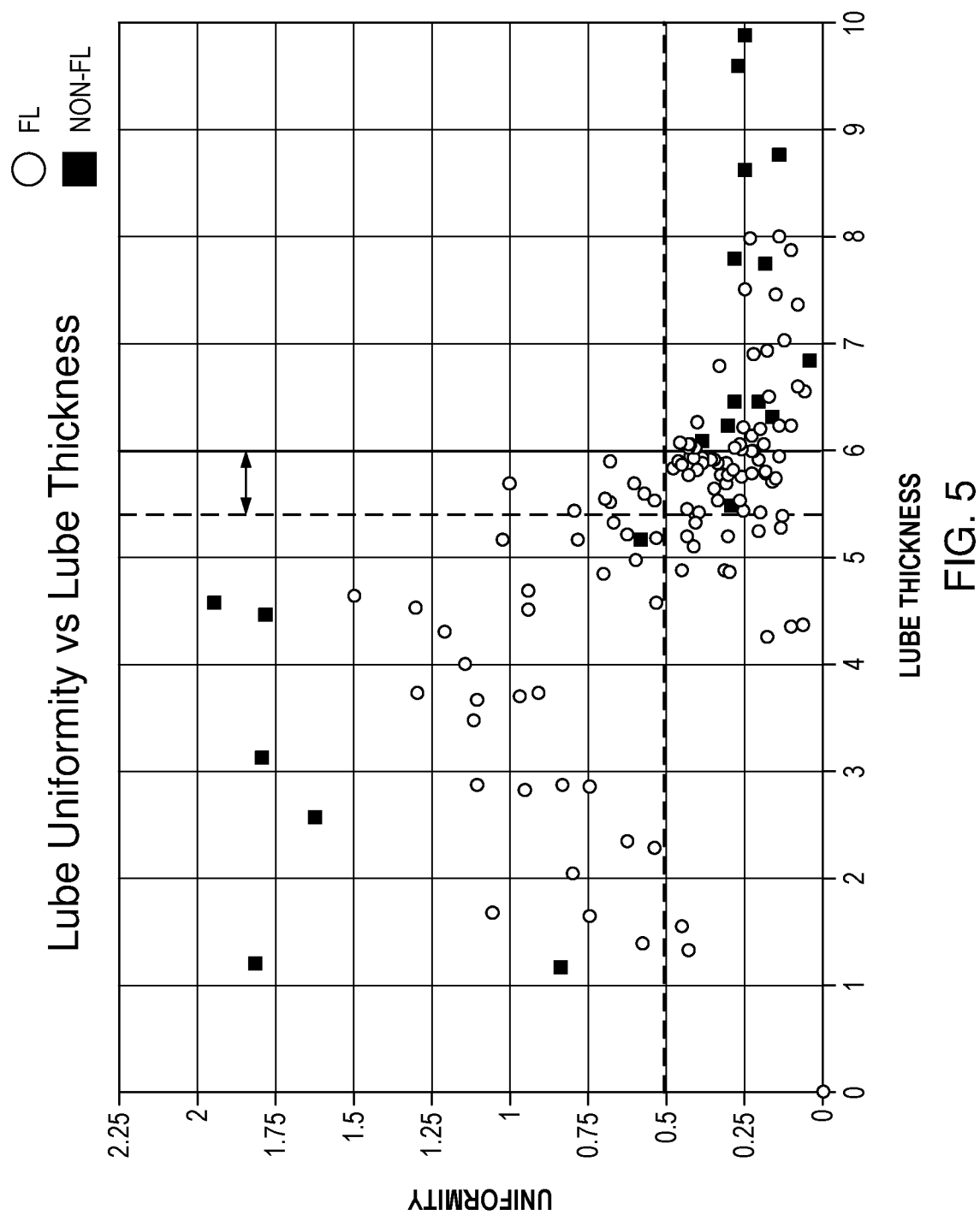
FIG. 5 is a graph showing the results for lubricant uniformity versus lubricant thickness for a non-fluorinated lubricant of the disclosure compared to a fluorinated lubricant according to aspects of the disclosure.

The molecular redesign, and its effects on the relationship between uniformity and lubricant thickness, can be seen in FIG. 5. As can be seen, the non-fluorinated lubricant has a uniformity from about between 0.26 and 0.55 Å at a lubricant thickness of between about 5 to 6 Å. In contrast, the fluorinated lubricant has a uniformity ranging from 0.15 Å to 1.05 Å at a lubricant thickness of between about 5 to 6 Å.

Main Chain-Side Chain Segment (Rb)

In one aspect, wherein a lubricant comprises the general formula (I):

$$Rv^1\text{-}Rb^1\text{—}Re^1\text{-}Rc\text{-}Re^2\text{—}Rb^2\text{-}Rv^2 \qquad (I)$$

The main chain linking segment $Re^1$-Rc-$Re^2$— is optionally free from fluorine and contains a stiffening group that has a higher rotational energy barrier than —$CH_2$—. The side chain segments $Rb^1$ and $Rb^2$ include a fluoroalkyl, fluoroalkenyl, perfluoroalkyl, or perfluoroalkyl ether moiety. In one aspect, each chain segment present in the lubricant may comprise or has the formula:

(i) —$CF_2CF_2CF_2O(CF_2CF_2CF_2CF_2O)_aCF_2CF_2CF_2$—;
(ii) —$CF_2CF_2O(CF_2CF_2CF_2O)_aCF_2CF_2$—;
(iii) —$CF_2CF_2O[CF(CF_3)CF_2O]_aCF_2CF_2$—;
(iv) —$CF_2O(CF_2CF_2O)_a(CF_2O)_bCF_2$—;
(v) —$CF_2O(CF_2CF_2O)_aCF_2$—;

or a combination thereof, wherein each a is, independently from 1 to 100, or from 1 to 20, or from 1 to 10, or from 1 to 5, and wherein each b, when present, is independently from 1 to 100, or from 1 to 20, or from 1 to 10, or from 1 to 5.

End Segment ($Rv^1$, $Rv^2$)

In one aspect of the disclosure, each end segment $Rv^1$ and $Rv^2$ may independently include or may have general formula (VII):

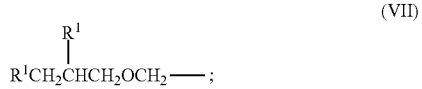

(VII)

wherein at least one $R^1$ is an anchoring functional group attachable to and/or engageable with a protective overcoat of a magnetic recording medium, comprising: a B, Si, pnictogen, chalcogen, or halogen, —$OR^*$, —$NR^*_2$, —$NR^*$—CO—$R^*$, —$OR^*$, —O—CO—$R^*$, —CO—O—$R^*$, —$SeR^*$, —$TeR^*$, —$PR^*_2$, —PO—$(OR^*)_2$, —O—PO—$(OR^*)_2$, —N=P$(NR^*_2)_3$, —$AsR^*_2$, —$SR^*$, —$SO_2$—$(OR^*)_2$, —$BR^*_2$, —$SiR^*_3$, —$(CH_2)_q$—$SiR^*_3$, —$(CF_2)_q$—$SiR^*_3$, or a combination thereof, wherein q is 1 to 10 and each R* is, independently a hydrogen, a pnictogen/chalcogen/halogen, or a saturated, unsaturated, aromatic, polycyclic aromatic, heteroaromatic, alicyclic, and/or a heterocyclic $C_1$-$C_{50}$ radical, and two or more R* may join together to form a ring structure. In one aspect, each end segment $Re^1$ and $Re^2$ may independently include at least one $R^1$ which may be a cyclic functional group which may include an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof, which may be further substituted with a functional group as disclosed herein. Anchoring functional groups can also include OH, —$NH_2$, —NH—CO—H, —OH, —O—CO—H, —CO—O—H, —SeH, —TeH, —$PH_2$, —PO—$(OH)_2$, —O—PO—$(OH)_2$, —N=P$(NH_2)_3$, —$AsH_2$, —SH, —$SO_2$—$(OH)_2$, —$BH_2$, —$SiH_3$, —$(CH_2)_q$—$SiH_3$, —$(CF_2)_q$—$SiH_3$, or a combination thereof, wherein q is 1 to 10.

In one aspect, one or more anchoring functional group may include, or is, a hydroxyl (—OH) moiety. In some aspects, each anchoring functional group includes a hydroxyl (—OH) moiety.

In another aspect, the anchoring functional group can contain an aromatic moiety, e.g., benzene:

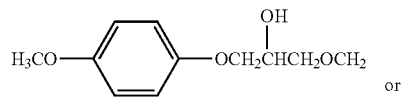

or

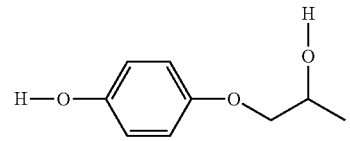

The aromatic group is not limited to benzene, but any aromatic group can be incorporated, e.g., anisole, benzene, naphthalene, anthracene, phenanthrene, dibenz[a,h]anthracene, pyrene, catechol or benzopyrene.

Exemplary Lubricant Structures

In one aspect, the lubricant includes or has a structure according to general formula (VIII):

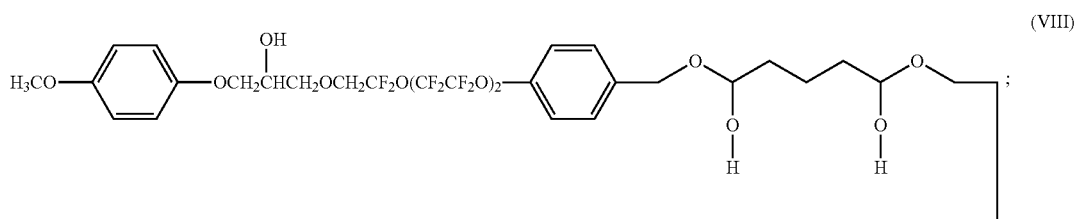
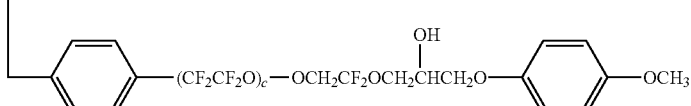

(VIII)

where a is from 1 to 100, or from 1 to 20, or from 1 to 10, or from 1 to 5; and c is from 1 to 100, or from 1 to 20, or from 1 to 10, or from 1 to 5.
In one aspect of the disclosure, the lubricant includes or has a structure according to general formula (IX):
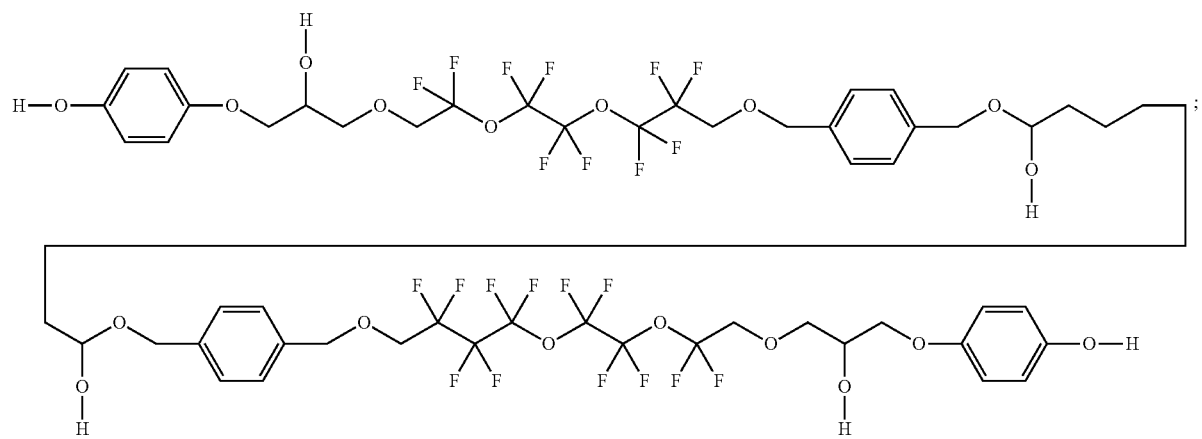
(IX)
In the disclosure, substitution of the benzene ring need not be para, ortho and meta isomers are also possible, e.g.:
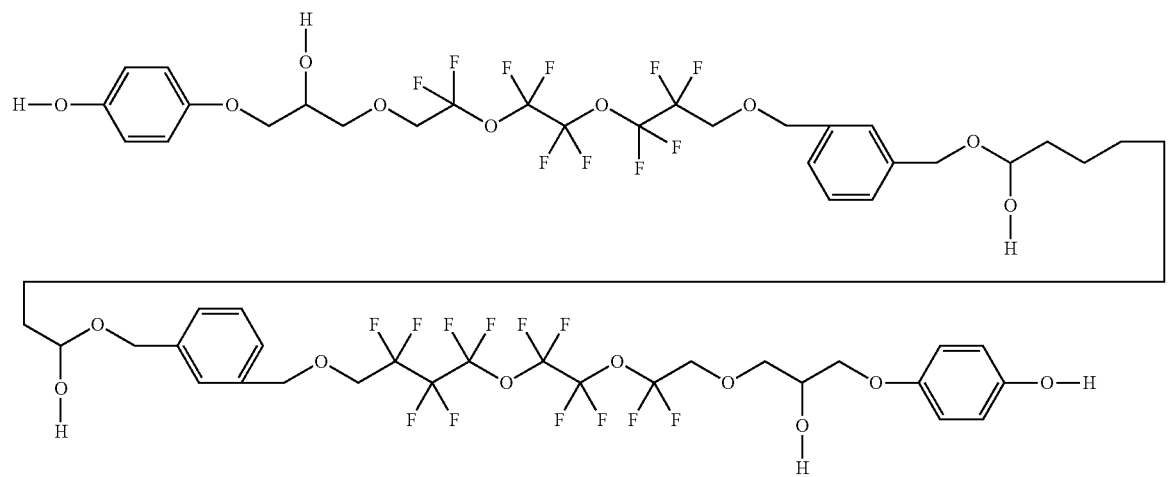
(X)

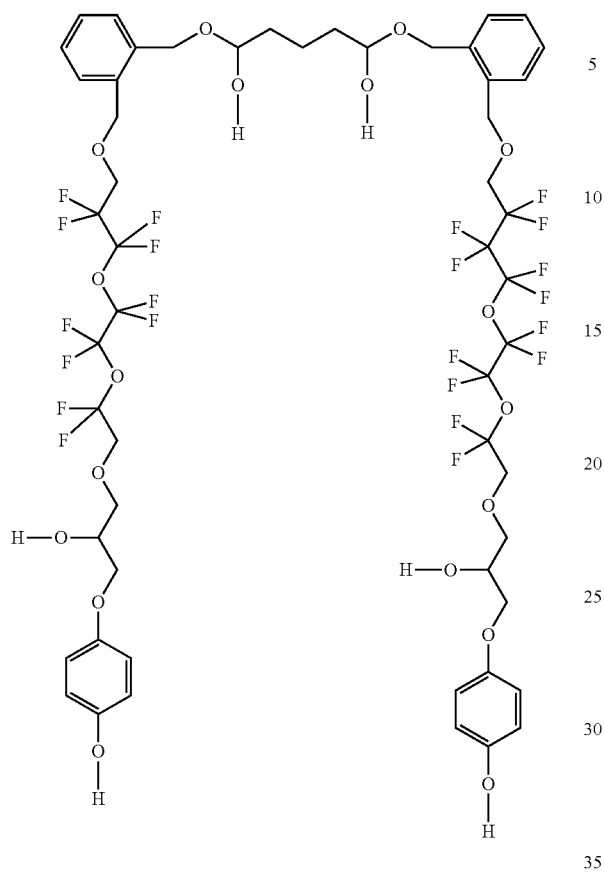
The aromatics are not restricted to benzene rings, and larger rings may be utilized, e.g., naphthalene:
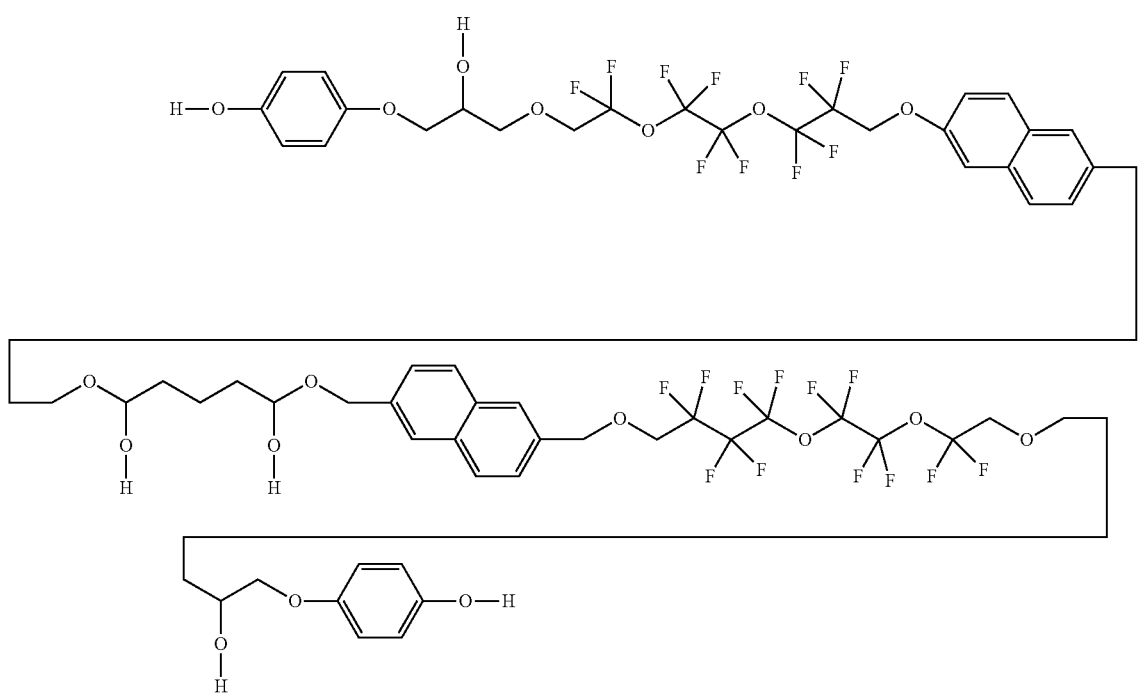

Ortho, meta and para positions can also occur when benzene is located near the ends of the molecule:

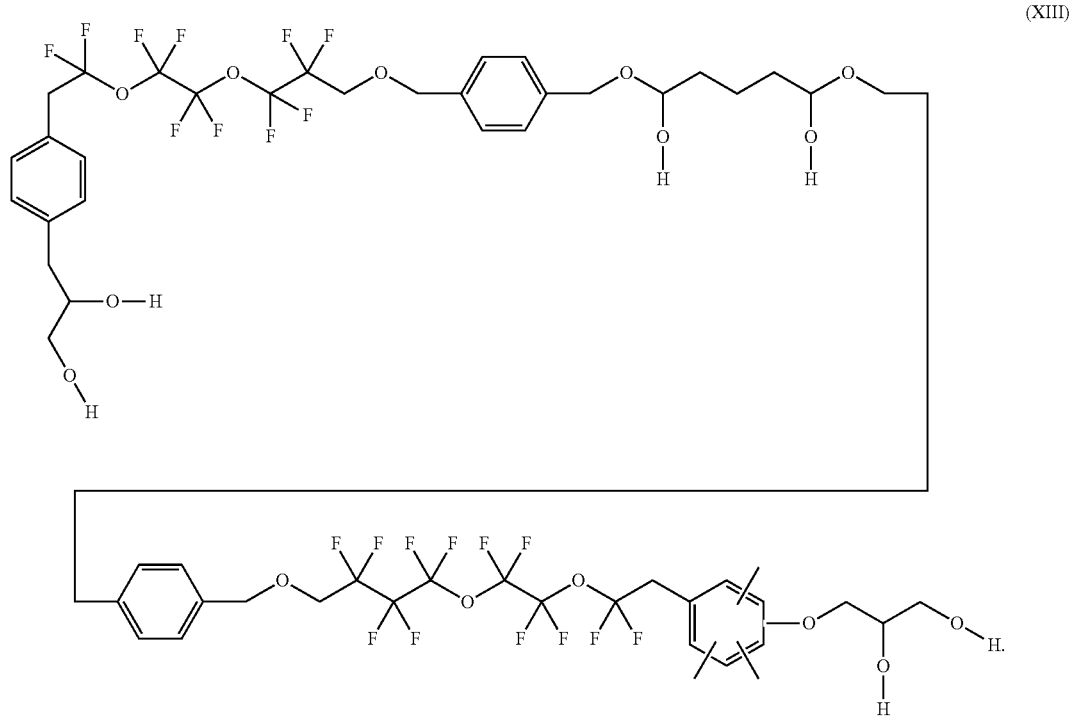

(XIII)

The chain can be of any length. However, very long chains will influence the head-disk clearance, which should be as small as possible.

Another aspect of the disclosure can be seen in formula (XIV):

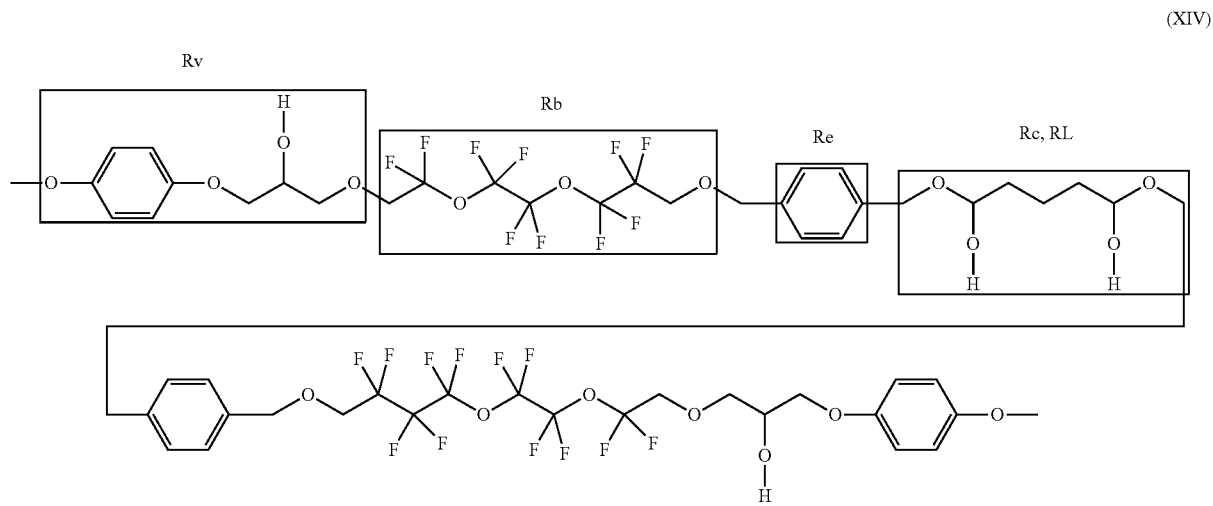

(XIV)

In this configuration the linker can contain F. Re is a divalent linking segment containing at least one group with higher rotational energy barrier than a $CH_2$—$CH_2$ bond and may contain at least one anchoring functional group engageable with a protective overcoat of a magnetic recording medium. Rv when present independently comprises an anchoring functional group engageable with a protective overcoat of a magnetic recording medium. Rc is a flexible segment comprising $CH_2$—$CH_2$ bonds or bonds of lower rotational energy barrier (i.e., $CH_2$—O) and may contain at least one anchoring functional group engageable with a protective overcoat of a magnetic recording medium. $R_L$ is $C_nM_n+2Pn$ wherein, n=1, M is H and P is any atom that gives a higher rotational energy barrier than a $CH_2$—$CH_2$ bond. Each $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof.

In one or more aspects, the lubricants are stable above about 250° C., or above about 300° C., or above about 325° C., or above about 350° C., or above about 375° C., and less than or equal to about 450° C., or 425° C. when determined in air, nitrogen, helium, or 90 vol % helium/10 vol % oxygen.

In one or more aspects, the lubricant has a weight average molecular weight of greater than or equal to about 0.5 kiloDalton (kDa), or from about 1 to about 20 kDa, or from about 2 to about 10 kDa, or from about 3 to about 7 kDa, or from about 1 to about 5 kDa, or 2 to about 4 kDa.

In one or more aspects, the lubricant has a weight average molecular weight of greater than or equal to about 500 grams per mole (g/mol), or from about 1,000 to about 20,000 g/mol, or from about 2,000 to about 10,000 g/mol, or from about 3,000 to about 7,000 g/mol, or from about 1,000 to about 5,000 g/mol, or 2,000 to about 4,000 g/mol.

In one or more aspects, the lubricants are essentially pure compounds, having a polydispersity, defined as the number average molecular weight Mn divided by the weight average molecular weight Mw (Mn/Mw) from about 1 to 2, or from about 1 to about 1.5, or from about 1 to about 1.1, or from about 1 to about 1.05.

Returning to FIG. 2, in one or more aspects, the magnetic recording medium 200 has a stacked structure which includes a lubricant layer 216 on the overcoat layer 214. The lubricant present in the layer may comprise a plurality of segments according to the general formula (I):

$$Rv^1\text{-}Rb^1\text{—}Re^1\text{-}Rc\text{-}Re^2\text{—}Rb^2\text{-}Rv^2 \qquad (I);$$

where Rc is an optionally non-fluorinated divalent linking segment comprising a first at least one least one anchoring functional group engageable with a protective overcoat of a magnetic recording medium; where each $Re^1$ and $Re^2$ is a moiety having as rotational energy barrier that is greater than the rotational energy barrier of $CH_2$; where each $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and where each of $Rv^1$ and $Rv^2$, when present, independently comprises a moiety having a second at least one anchoring functional group engageable with the protective overcoat of a magnetic recording medium.

In the disclosure at least one anchoring functional group comprises at least one of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated C1-C50 radical, an unsaturated C2-C50 radical, an aromatic C4-C50 radical, a polycyclic aromatic C5-C50 radical, a heteroaromatic C5-C50 radical, an alicyclic C3-C50 radical, and/or a heterocyclic C2-C50 radical, and wherein two or more R* may join together to form a ring structure.

In one or more aspects, the average thickness of the lubricant layer of the magnetic recording medium is less than about 10 nanometers (nm), or less than about 5 nm, or less than or equal to about 1 nm. In some aspects, the lubricant of the magnetic recording medium has an average thickness from about 0.1 nm to about 10 nm, or from about 0.1 nm to about 1 nm.

In one or more aspects of the magnetic recording medium, the lubricant may have a bonding percentage of at least about 30%, or at least about 50%, or at least about 70%, or at least about 80%, or at least about 90%, and less than or equal to about 99%, or less than or equal to about 95%, corresponding to a post-stripping bonding level of the lubricant to the total area of an upper surface of the protective overcoat.

In one aspect, a magnetic data storage system may include a magnetic head; a magnetic recording medium according to any one or a combination of aspects disclosed herein including a lubricant according to one or more aspects disclosed herein, a drive mechanism for moving the magnetic head over the magnetic recording medium; and a controller electrically coupled to the magnetic head for controlling operation of the magnetic head.

Fluorination and Evaporation

Figure 4A:
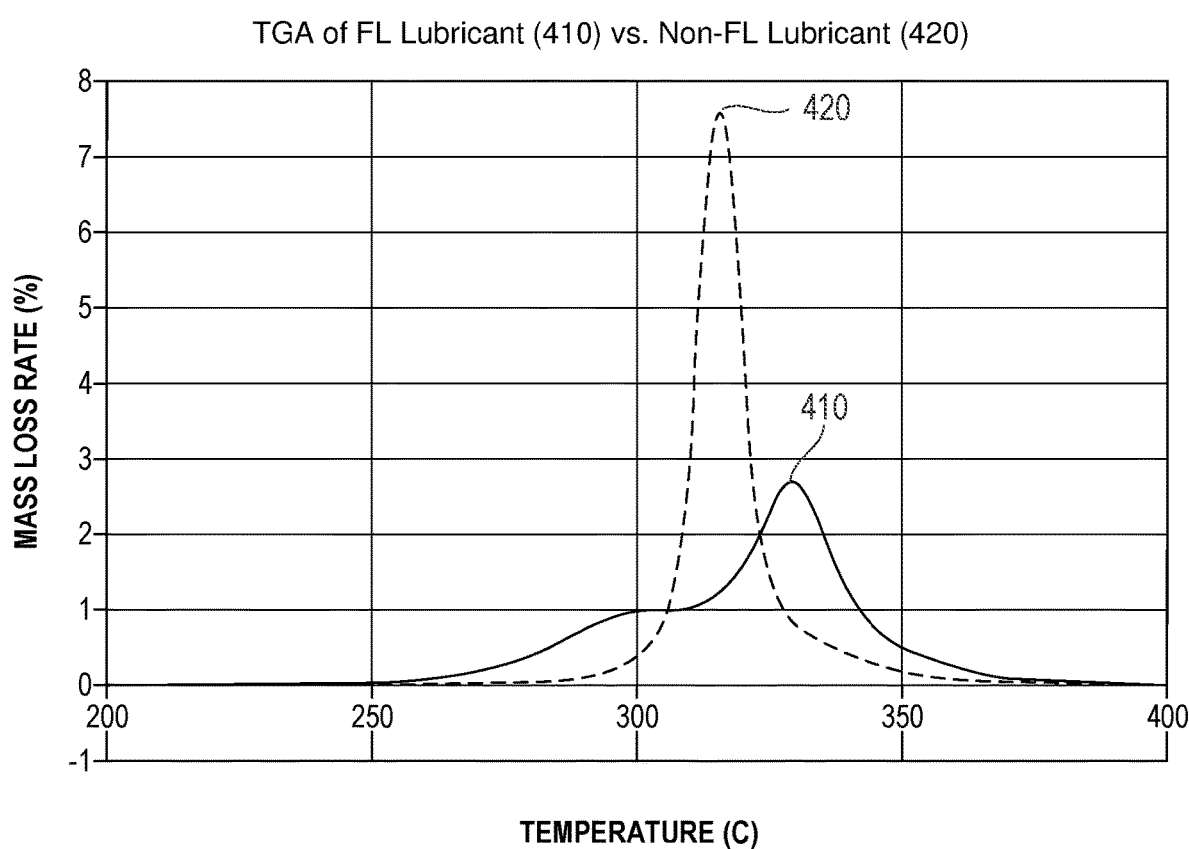
FIG. 4A shows the thermogravimetric analysis (TGA) chart of a fluorinated lubricant compared to a non-fluorinated lubricant.
Figure 4B:
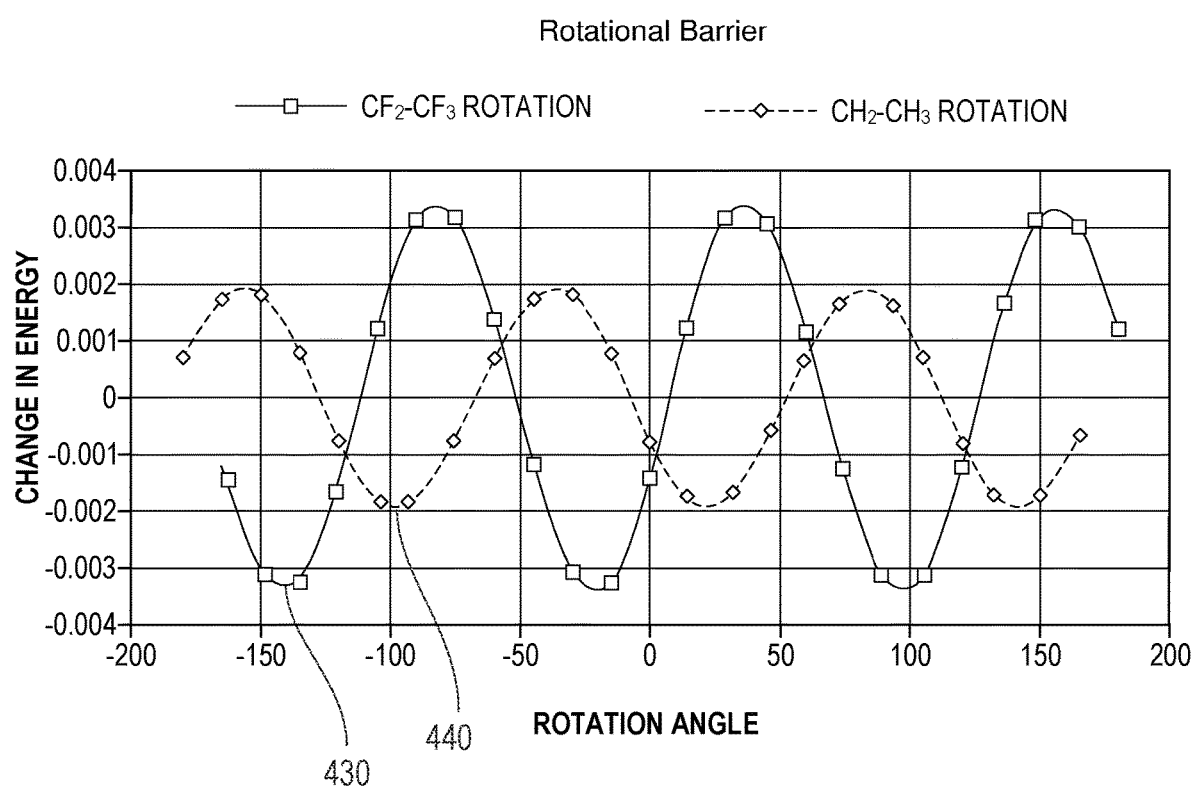
FIG. 4B shows the rotational barrier energy for a fluorinated lubricant compared to a non-fluorinated lubricant.
Figure 4C:
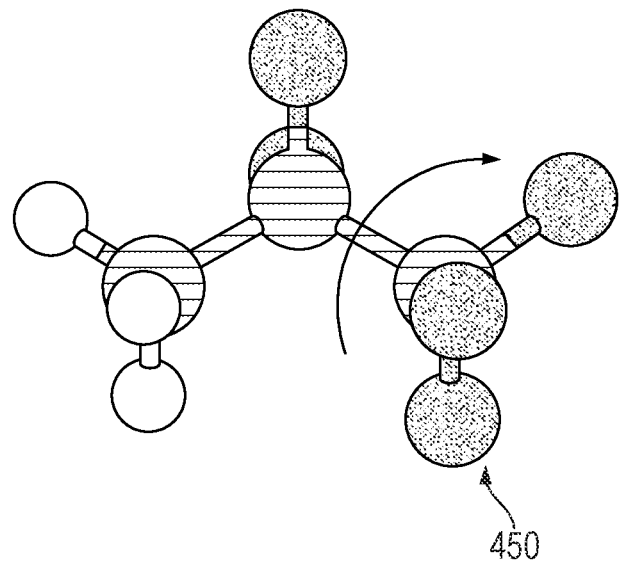
FIG. 4C shows drawings of fluorinated and non-fluorinated propane molecules
Figure 4C:
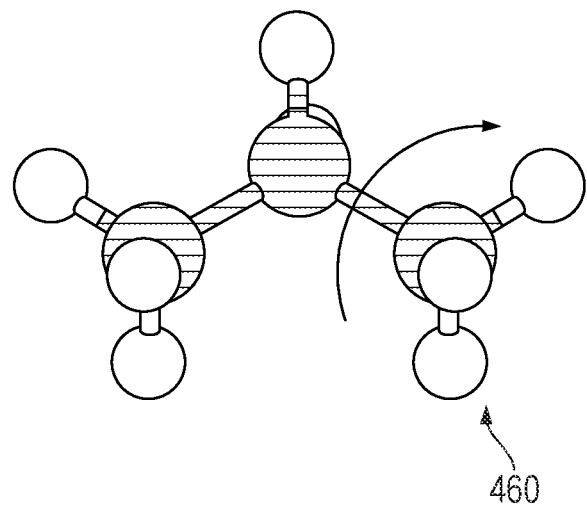

FIGS. 4A, 4B and 4C show the relationship between fluorination and evaporation for a fluorinated lubricant (410, 430, 450) compared to a non-fluorinated lubricant (420, 440, 460). FIG. 4A shows the thermogravimetric analysis (TGA) chart of a fluorinated lubricant compared to a non-fluorinated lubricant. FIG. 4B shows the rotational barrier energy for a fluorinated lubricant compared to a non-fluorinated lubricant. FIG. 4C shows drawings of fluorinated and non-fluorinated propane molecules. The thermogravimetric analysis (TGA) chart in FIG. 4A shows that fluorination in the fluorinated molecule represented by curve 410 increases the evaporation temperature minimally to cause a shift of about +14° C. from that of the non-fluorinated molecule represented by curve 420. This is likely driven by the increase in rigidity of the linker group to render at about 1.7 times stiffer. This is verified by the rotational barrier results for the two molecules shown in FIG. 4B, where the $CF_2$—$CF_3$ rotation, represented by curve 430, is clearly out of phase with the $CH_2$—$CH_3$ rotation, represented by curve 440. This observation holds for other moieties that have more steric hindrance, i.e., higher rotational energy barrier, than $CH_2$—$CH_3$, for example, aromatic rings, ethers, ketones, esters, amides, etc. FIG. 4C shows the fluorinated propane molecule 450 having a larger electron cloud about each fluorine molecule than the corresponding non-fluorinated propane molecule 460. The steric hindrance in the fluorinated molecule impedes rotation, thus raising the barrier energy.

FIG. 5 shows the results for lubricant uniformity versus lubricant thickness for a non-fluorinated lubricant of the disclosure compared to a fluorinated lubricant. It can be seen the fluorination in the linker group leads to poor processability at the desired thickness. Using 0.5 Å as the reference line, both the fluorinated and non-fluorinated lubricants show a wide scatter at thicknesses less than 5 Å. At lube thicknesses between about 2 Å and 6 Å the scatter ranges between 0.5 Å to 2 Å. In one aspect, the non-fluorinated lubricant allows for tight uniformity range down to approximately 5 Å, whereas the fluorinated version only allows a tight uniformity range to 6 Å. The increase in linker stiffness caused by the inclusion of fluorine is the probable cause of the wide scatter of the fluorinated material in the desired range. The solubility parameter for the non-fluorinated linker is 11.635 compared to 10.637 for the fluorinated

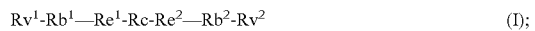

linker. The solubility parameter δ can be defined as the square root of the cohesive energy density:

$$\delta = \sqrt{\frac{\Delta Hv - RT}{Vm}}$$

with units of (calories/cm$^3$)$^{1/2}$ based on an ideal gas where PV=nRT.

The cohesive energy density is the amount of energy needed to completely remove unit volume of molecules from their neighbors to infinite separation (an ideal gas). This is equal to the heat of vaporization of the compound divided by its molar volume in the condensed phase.

Figure 6:
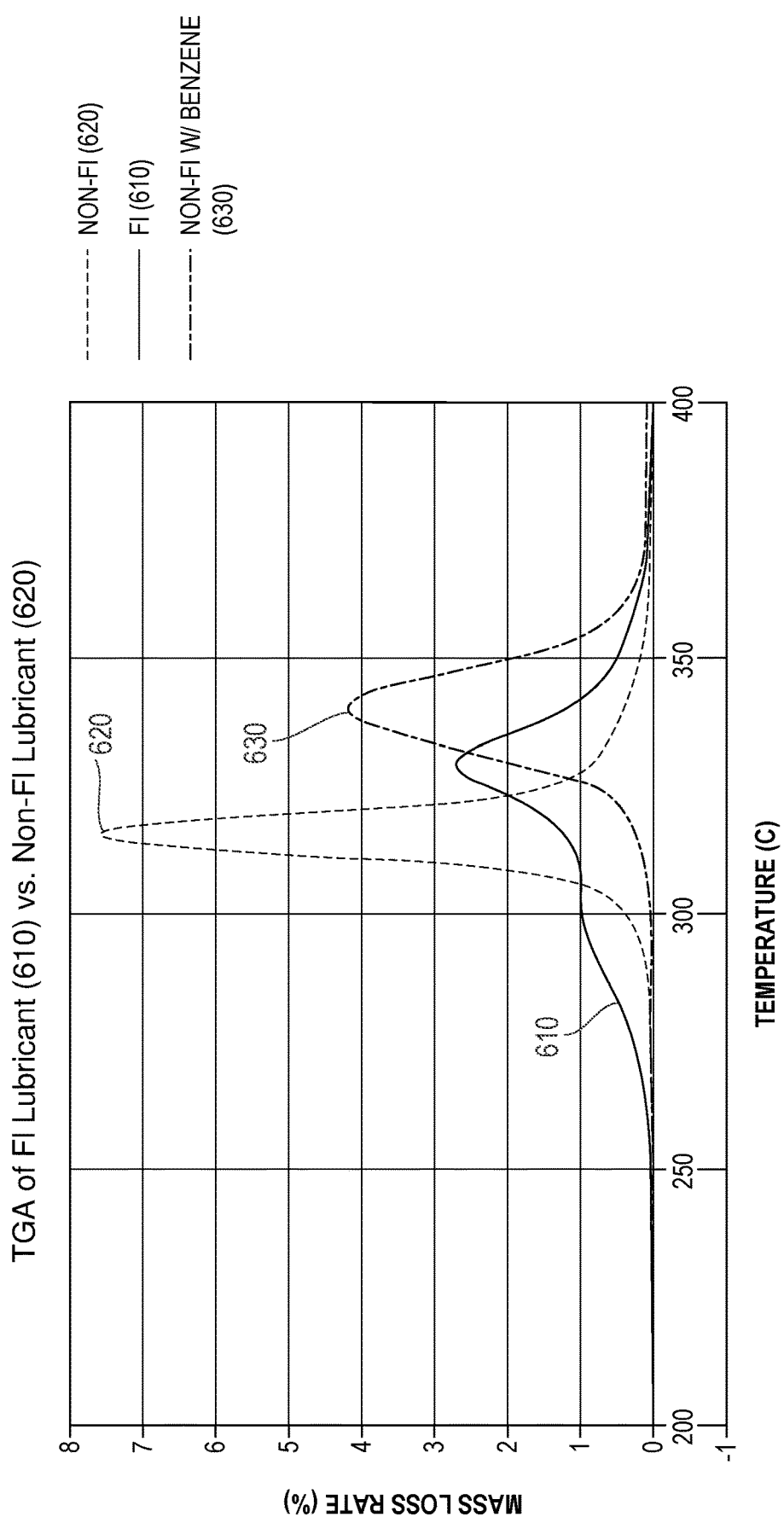
FIG. 6 is a graph showing the results for the thermogravimetric analysis (TGA) of a fluorinated lubricant compared to a non-fluorinated lubricant and a non-fluorinated lubricant containing benzene rings, according to aspects of the disclosure.

FIG. 6 is a graph showing the results for the thermogravimetric analysis (TGA) of a fluorinated lubricant 610 (FL) compared to a non-fluorinated lubricant 620 (Non-FL) and a non-fluorinated lubricant containing benzene rings 630 (Non-FL w/ Benzene). As can be seen, the inclusion of benzene rings increases the TGA transition temperature more than fluorination. The benzene rings impact both chain stiffness and solubility differently than fluorination. The mechanism is probably that the benzene rings have a higher rotational energy barrier, i.e., rotate less, than CF$_2$ groups. The inclusion of benzene rings into the linker results in maintaining high evaporation while maintaining processability.

Figure 7:
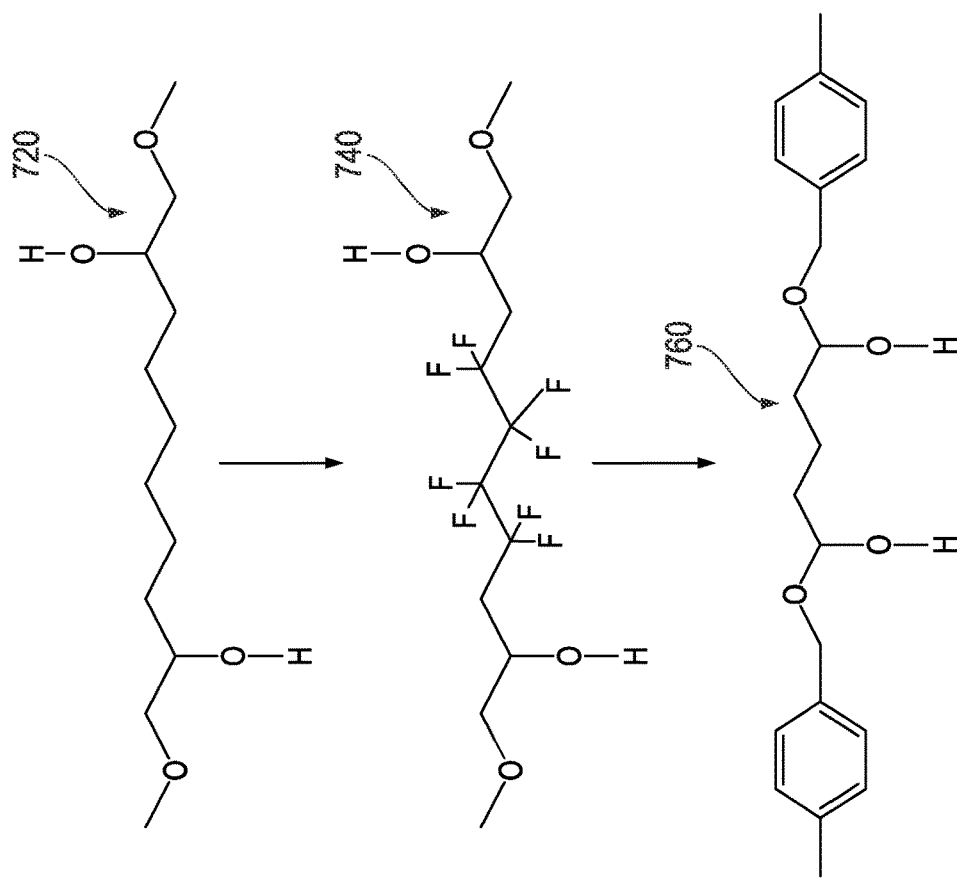
FIG. 7 shows a shape analysis of the various types of central linker segments according to aspects of the disclosure.
Figure 7:
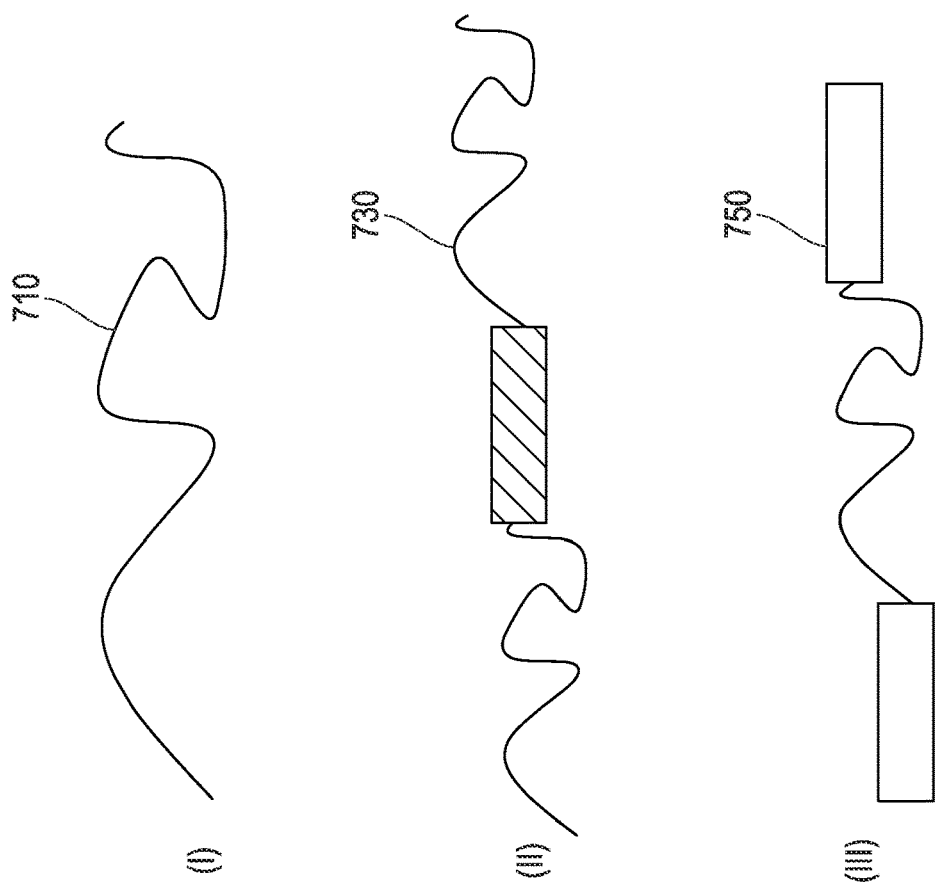

FIG. 7 shows a shape analysis of the various types of central linker segments. At the top in Configuration I is a line diagram 710 of, and corresponding exemplary chemical formula 720, of a linker segment in which no stiffness is added by the presence of fluorine or aromatic rings such as benzene. In the middle in Configuration (II) is a fluorinated linker line and block diagram 730 next to a corresponding exemplary chemical formula 740, where the stiffness added by the fluorination results in a stiff central portion of the linker. At the bottom in Configuration (III) is linker line and block diagram 750 next to a corresponding exemplary chemical formula 760 showing the effect of adding aromatic rings such as benzene rings to the structure, which results in two stiff ends of the linker, while the center, which contains, for example, —OH anchoring groups, is soft and provides the steric freedom to better promote bonding to the substrate.

Figure 8:
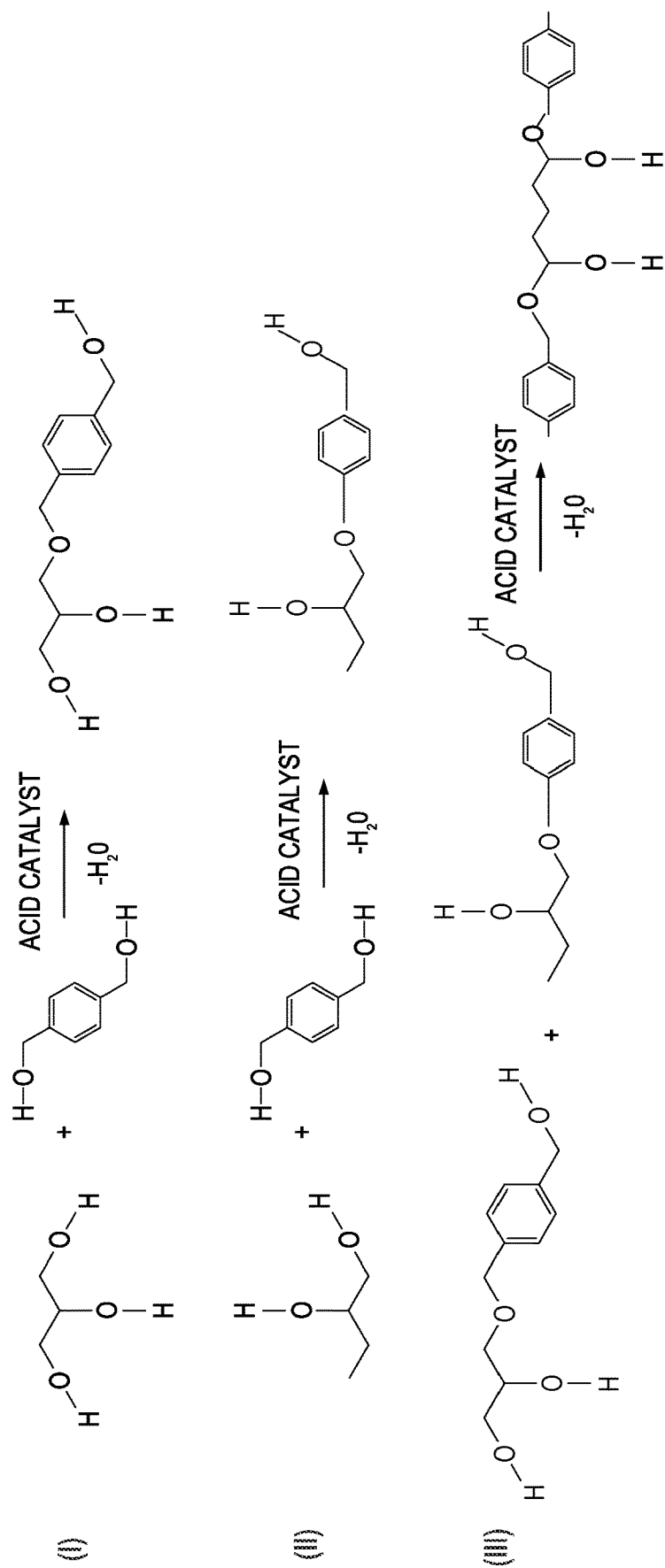
FIG. 8 shows the synthetic pathway to obtaining the benzene substituted linker according to aspects of the disclosure.

FIG. 8 shows the synthetic pathway to obtaining the benzene substituted linker according to the disclosure. At the top of FIG. 8, in Reaction (I), hydroquinone (benzene-1,4-diol or 1,4-dimethoxybenzene) is reacted with 1, 2, 3-trihydroxy propane in a dehydration reaction to yield a benzene-1-hydroxy-4-dihydroxypropyloxy compound. In the middle of FIG. 8, in Reaction (II), hydroquinone is reacted with 1,2-dihydroxy propane in a dehydration reaction to yield a benzene-1-hydroxy-4-hydroxypropyloxy compound. At the bottom of FIG. 8, in Reaction (III), benzene-1-hydroxy-4-dihydroxypropyloxy is reacted with benzene-1-hydroxy-4-hydroxypropyloxy in a dehydration reaction to yield a diethoxybenzyl-dihydroxy pentane structure of an exemplary central linking element of the disclosure.

As can accordingly be seen, hydroquinone undergoes a dehydration reaction with trihydroxy propane (glycerol) or dihydroxy propane to yield a benzoxy-substituted glycerol ether. A subsequent dehydration reaction yields the dibenzene substituted linker of the disclosure.

Media Fabrication

Figure 9:
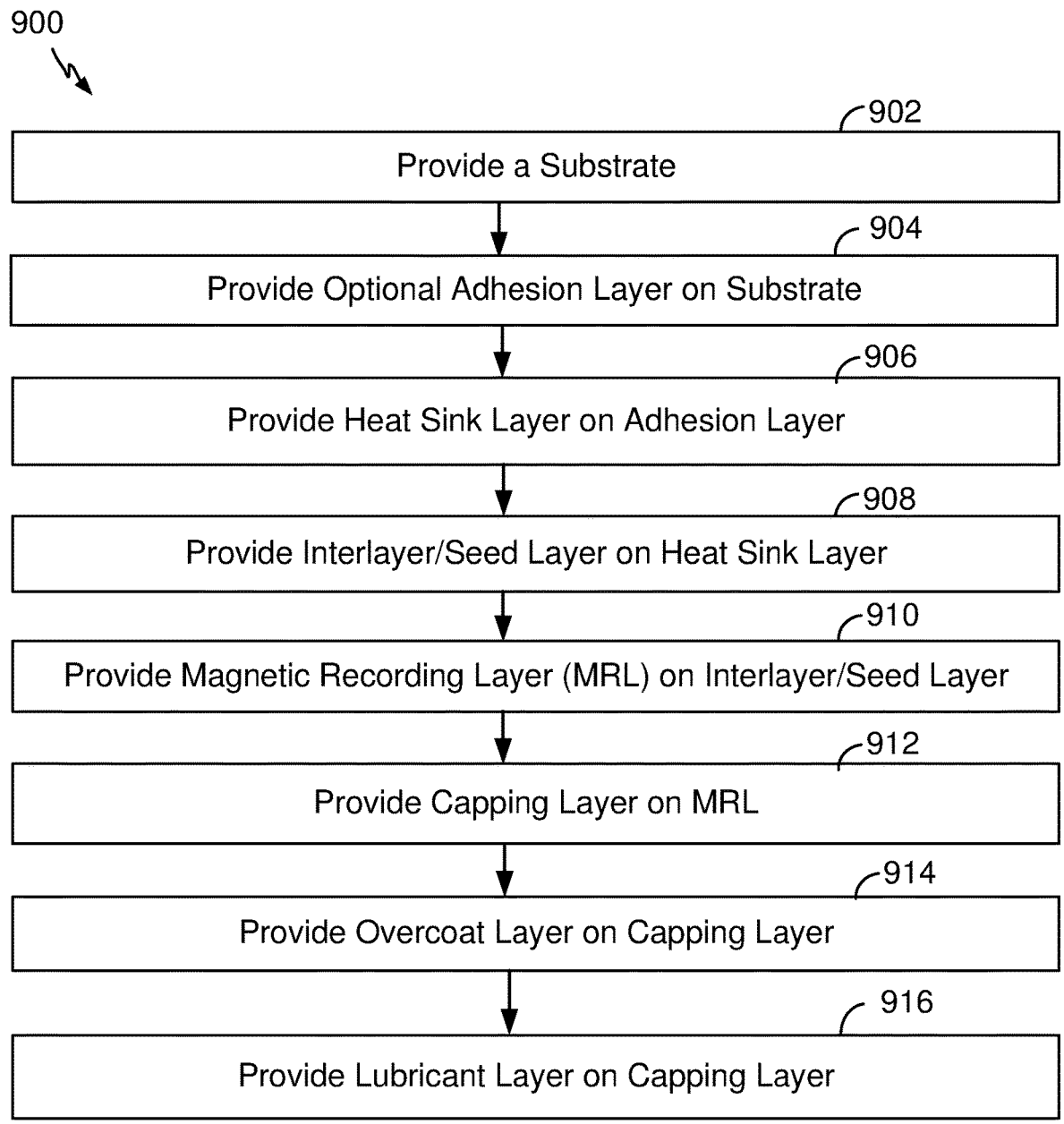
FIG. 9 is a flowchart of an exemplary process for fabricating a HAMR medium that includes a magnetic recording layer, a capping layer, an overcoat and a lubricant, in accordance with an aspect of the disclosure.

FIG. 9 is a flowchart of an exemplary process 900 for fabricating a HAMR medium that includes a lubricant in accordance with an aspect of the disclosure. In one aspect, the process 900 can be used to fabricate the HAMR media described above, including medium 200 shown in FIG. 2.

At block 902, the process provides a substrate (e.g., substrate 202). At block 904, the process provides an optional adhesion layer (e.g., adhesion layer 204). At block 906, the process provides a heat sink layer (e.g., heat sink layer 206). In one aspect, at block 908, the process may additionally provide an interlayer/seed layer (e.g., interlayer 208). At block 910, the process provides a magnetic recording layer (MRL) (e.g., MRL 210). At block 912, the process provides a capping layer (e.g., capping layer 212).

At block 914, the process provides an overcoat layer (e.g., overcoat layer 214). At block 916, the process provides a lubricant layer (e.g., lubricant layer 218).

It is important to note that in alternative approaches, the lubricant layer formed above the protective overcoat may include any of the multidentate fluoroalkyl, fluoroalkenyl, perfluoroalkyl, or perfluoropolyether boundary lubricants described herein, singly and/or in any combination.

In various aspects, the lubricant layer can be formed on the magnetic recording medium, specifically on the protective overcoat, via a dip coating method. For instance, in one aspect the magnetic recording medium may be dipped into a lubricant bath including the multidentate perfluoropolyether boundary lubricant according to one or more aspects of the disclosure and a fluorocarbon solvent such as HFE7100 (methoxy-nonafluorobutane) or Vertrel-XF (hydrofluorocarbon fluid). After a predetermined amount of time, the magnetic recording medium may be pulled out from the lubricant bath at a controlled rate. The solvent may then evaporate, leaving behind a lubricant layer comprising the multidentate perfluoropolyether boundary lubricant. The bonding percentage is quantified by stripping the lubricated magnetic recording medium with the solvents used in the lubricant bath at various post-lube time periods.

The thickness of the lubricant layer may be tuned by controlling the submergence duration of the magnetic recording medium in the lubricant bath, the rate at which the magnetic recording medium is removed from the coating solution, and/or the concentration of the boundary lubricant (e.g. the lubricant according to one or more aspects of the disclosure) in the lubricant bath.

In one or more aspects, the concentration of lubricant in the lubricant bath may be in a range from about 0.001 g/L to about 1 g/L. In yet other aspects, the concentration of the lubricant in the lubricant bath may be selected so as to achieve a resulting lubricant layer with a thickness in a range of less than or equal to about 10 nanometers (nm), or less than or equal to about 5 nm, or less than or equal to about 1 nm or from 0.1 nm to less than about 1 nm.

Likewise, the formation of the lubricant layer on the surface of the magnetic recording medium, specifically on the surface of the protective overcoat, is not limited to dip coating, but may also involve spin coating, spray coating, a vapor deposition, combinations thereof, or any other suitable coating process as would be understood by one having skill in the art upon reading the present disclosure.

It should be noted that methodology presented herein for at least some of the various aspects may be implemented, in whole or in part, in computer hardware, by hand, using specialty equipment, etc. and combinations thereof.

Moreover, any of the structures and/or steps may be implemented using known materials and/or techniques, as would become apparent to one skilled in the art upon reading the present disclosure.

In some aspects, the processes herein can perform the sequence of actions as described above for media fabrication in a different order. In other aspects, the processes can skip one or more of the actions. In still other aspects, one or more of the actions are performed simultaneously. In some aspects, additional actions can be performed. For example, in one aspect, the process may include any additional actions needed to fabricate the magnetic recording layer structure.

In some aspects, the forming or deposition of such layers can be performed using a variety of deposition sub-processes, including, but not limited to physical vapor deposition (PVD), direct current (DC) sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

The terms "on," "above," "below," and "between" as used herein refer to a relative position of one layer with respect to other layers. As such, one layer deposited or disposed on/above or below another layer may be directly in contact with the other layer or may have one or more intervening layers. Moreover, one layer deposited or disposed between layers may be directly in contact with the layers or may have one or more intervening layers.

Accordingly, the lubricants according to aspects of this disclosure demonstrate improved thermal stability/oxidation resistance, improved contamination robustness at sub-nanometer level, low profile for higher ADC with improved writability/readability, reasonable head wear and flyability performances, an improved bonding ratio, and improved processability/yields with an increased uniformity. The lubricants according to aspects of this disclosure are suitable for use in high-temperature applications while maintaining or improving mechanical interface integration robustness, reliability, and magnetic spacing.

The above description is made for the purpose of illustrating the general principles of the present disclosure and is not meant to limit the inventive concepts claimed herein. Further, particular features described herein can be used in combination with other described features in each of the various possible combinations and permutations.

It should be noted that in the development of any such actual aspect, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device, system and/or method used/disclosed herein can also comprise some components other than those cited.

Unless otherwise specifically defined herein, all terms are to be given their broadest possible interpretation including meanings implied from the specification as well as meanings understood by those skilled in the art and/or as defined in dictionaries, treatises, and the like.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 20 angstroms (Å) refers to a thickness of 20 Å+/−2 Å, e.g., from 18 Å to 22 Å in this example.

In the summary and this detailed description, each numerical value should be read once as modified by the term "about" (unless already expressly so modified), and then read again as not so modified unless otherwise indicated in context. Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at." The term "and/or" refers to both the inclusive "and" case and the exclusive "or" case, and such term is used herein for brevity. For example, a composition comprising "A and/or B" may comprise A alone, B alone, or both A and B.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is directly on another component and/or in another component (e.g., directly on a surface of a component or embedded in a component). Thus, for example, a first component that is over the second component may mean that (1) the first component is over the second component, but not directly touching the second component, (2) the first component is directly on (e.g., directly on a surface of) the second component, and/or (3) the first component is in (e.g., embedded in) the second component. The term "about 'value X'", or "approximately value X," as used in the disclosure shall mean within 10 percent of the 'value X'. For example, a value of about 1 or approximately 1 would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X," with the meaning noted above.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. A lubricant comprising a plurality of segments according to general formula (I):

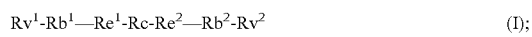

$Rv^1\text{-}Rb^1\text{—}Re^1\text{-}Rc\text{-}Re^2\text{—}Rb^2\text{-}Rv^2$ (I);

wherein Rc is a non-fluorinated linear divalent linking segment comprising at least one least one first anchoring functional group engageable with a protective overcoat of a magnetic recording medium;

wherein each $Re^1$ and $Re^2$ is a moiety having a rotational energy barrier that is greater than a rotational energy barrier of $CH_2$;

wherein each $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof;

wherein each of $Rv^1$ and $Rv^2$ independently comprises a moiety having at least one second anchoring functional group engageable with the protective overcoat of the magnetic recording medium, and wherein the lubricant is selected from the group consisting of formulas (VIII) through (XIII):

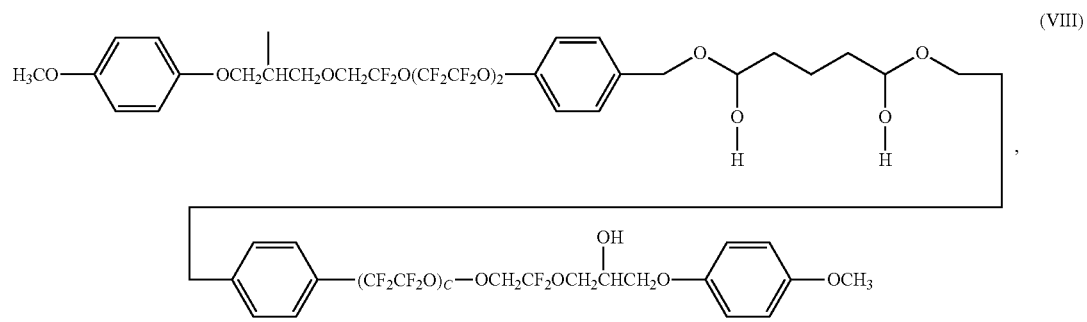

(VIII)

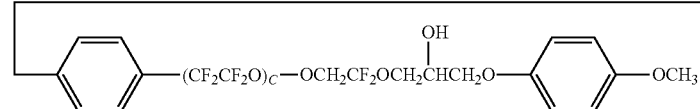

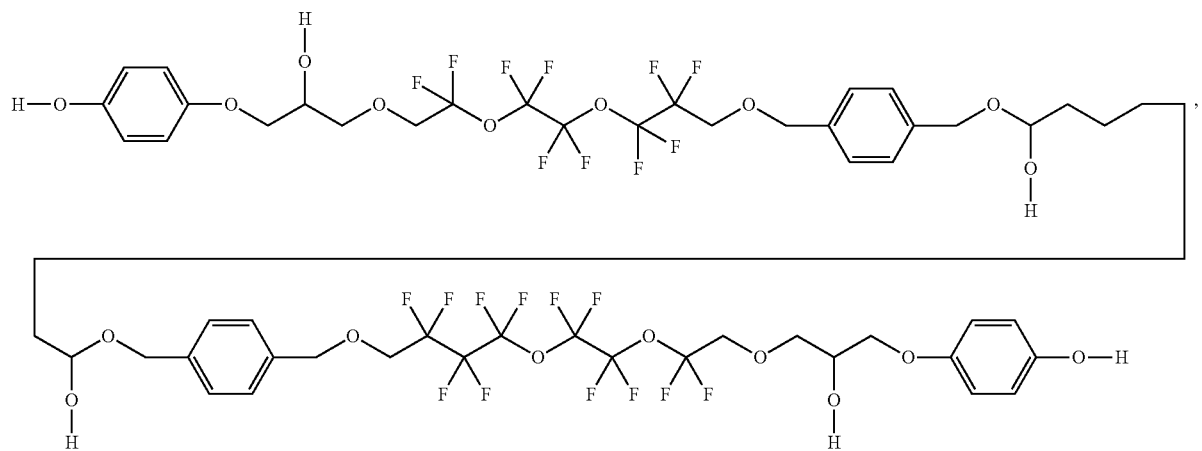

(IX)

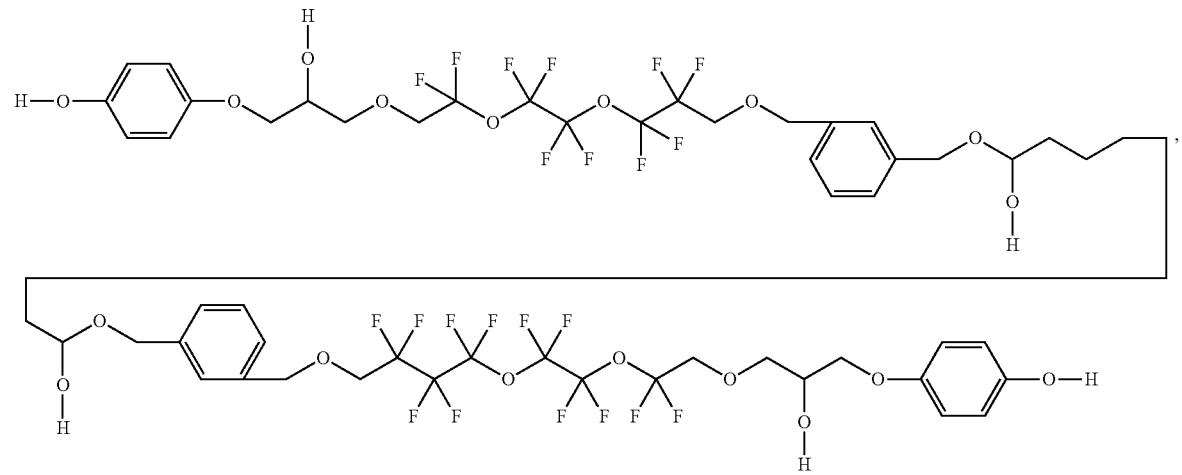
(X)
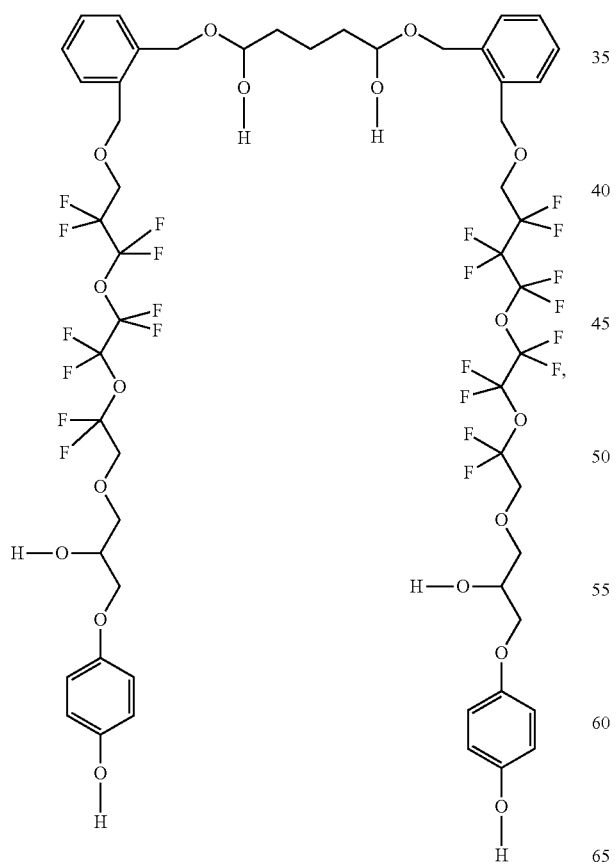
(XI)

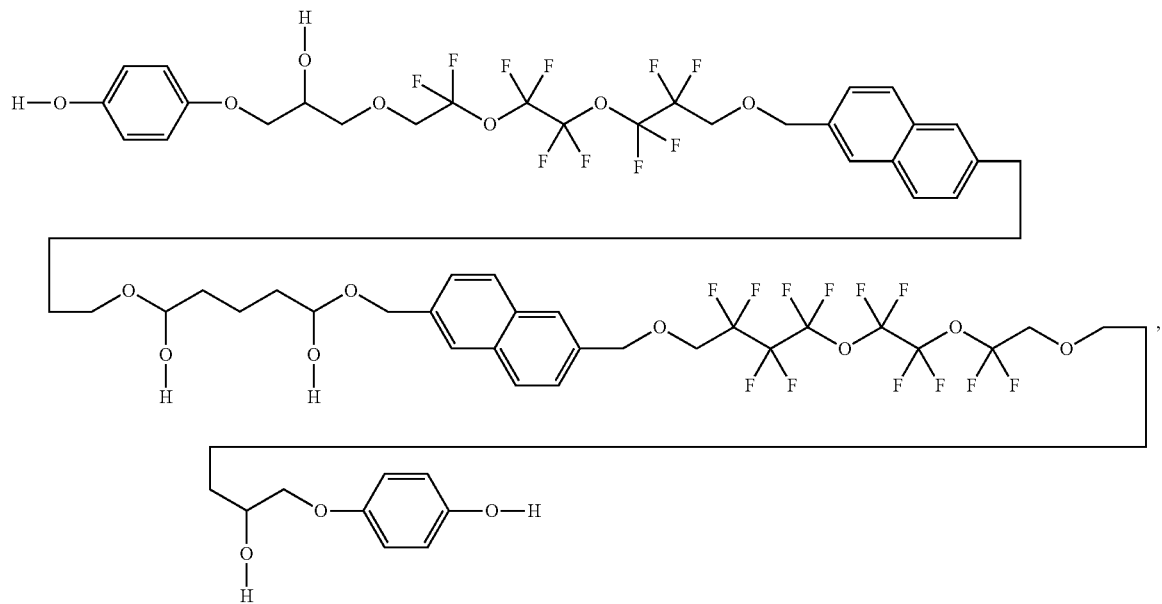

(XII)

and

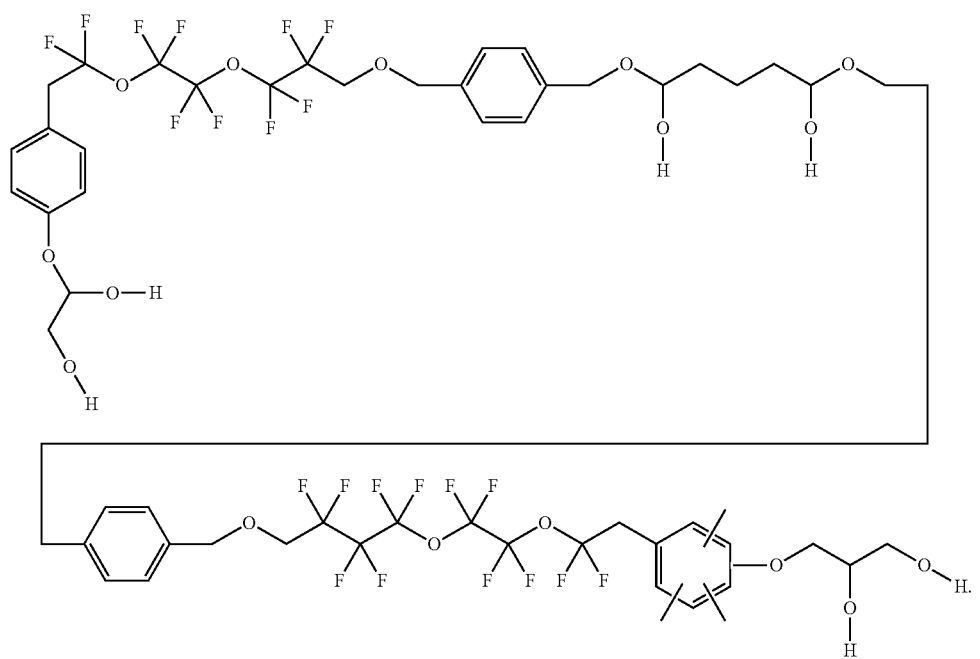

(XIII)

2. A magnetic recording medium, comprising:
a magnetic recording layer on a substrate;
a protective overcoat on the magnetic recording layer; and
a lubricant layer comprising the lubricant according to claim 1 on the protective overcoat.

3. The magnetic recording medium of claim 2, wherein the lubricant has a uniformity of about 0.2 to 0.3 Å at a lubricant thickness of between about 6 to 10 Å.

4. A data storage system, comprising:
at least one magnetic head;
a magnetic recording medium including the lubricant of claim 1;
a drive mechanism for positioning the at least one magnetic head over the magnetic recording medium; and
a controller electrically coupled to the at least one magnetic head for controlling operation of the at least one magnetic head.

5. A data storage system, comprising:
a slider comprising at least one magnetic head and an air bearing surface (ABS), wherein a lubricant according to claim 1 is disposed on the ABS; and
a magnetic recording medium including a magnetic recording layer;

wherein the slider is configured to write information to the magnetic recording layer using heat assisted magnetic recording (HAMR).

6. The lubricant of claim 1, having the formula (VIII):

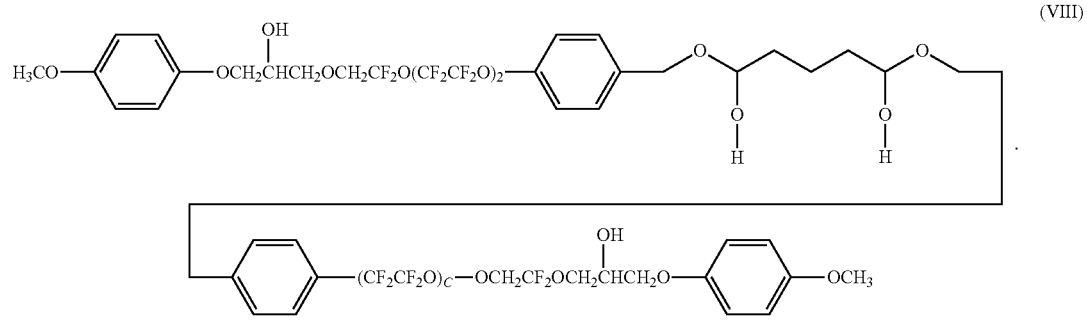

7. The lubricant of claim 1, having the formula (IX):

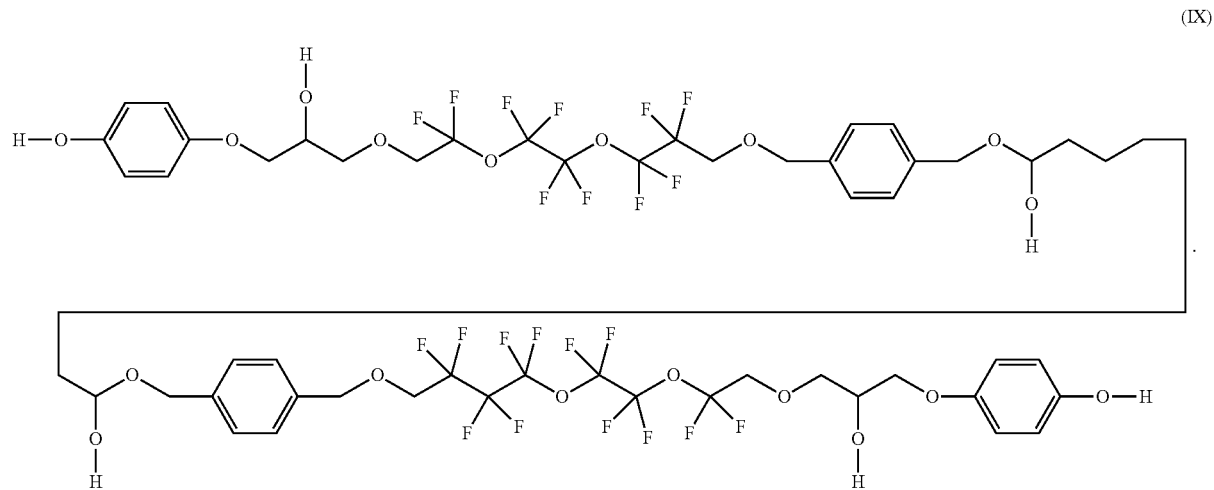 [SMILES: Oc1ccc(OCC(O)COCC(F)(F)OC(F)(F)C(F)(F)OC(F)(F)C(F)(F)COCc2ccc(COC(O)CCCCCCCC(O)OCc3ccc(COCC(F)(F)C(F)(F)C(F)(F)OC(F)(F)C(F)(F)OC(F)(F)COCC(O)COc4ccc(O)cc4)cc3)cc2)cc1]

8. The lubricant of claim 1, having the formula (X):
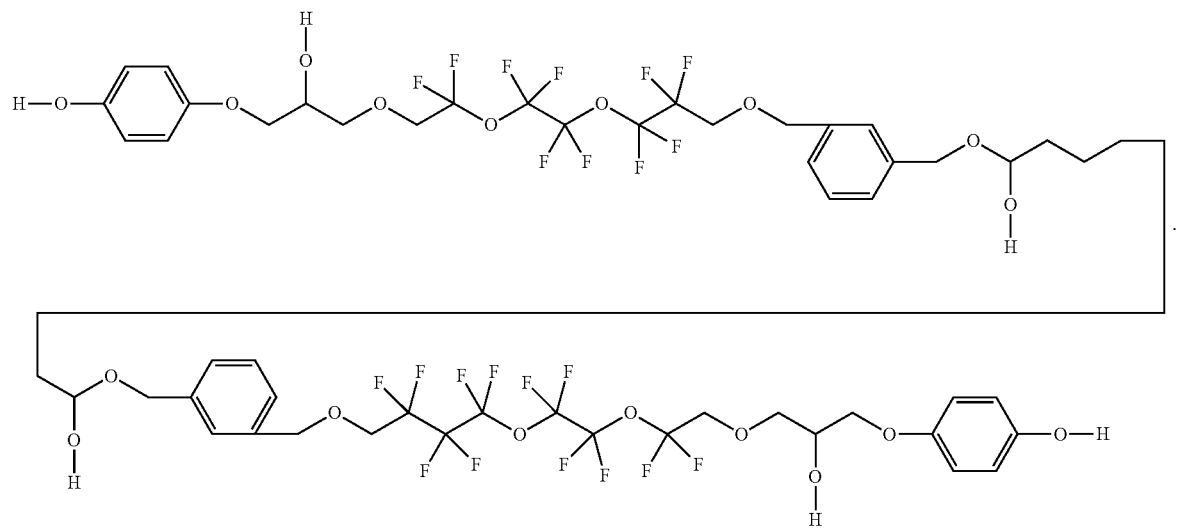
9. The lubricant of claim 1, having the formula (XI):
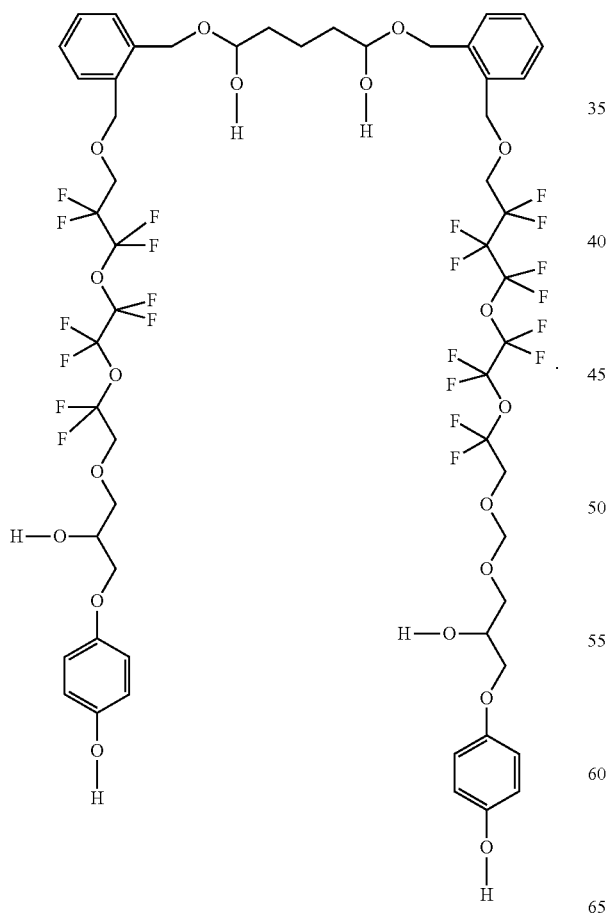

10. The lubricant of claim 1, having the formula (XII):
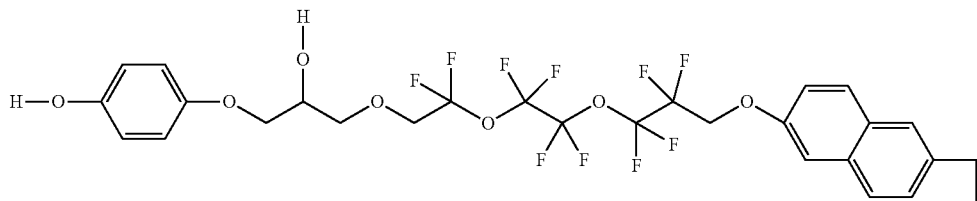
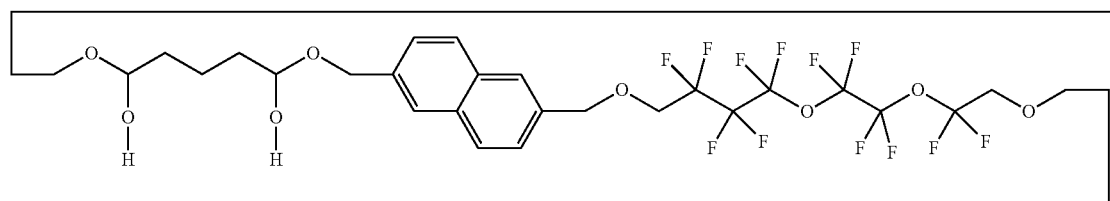
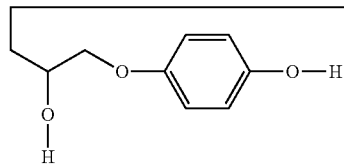
(XII)
11. The lubricant of claim 1, having the formula (XIII):
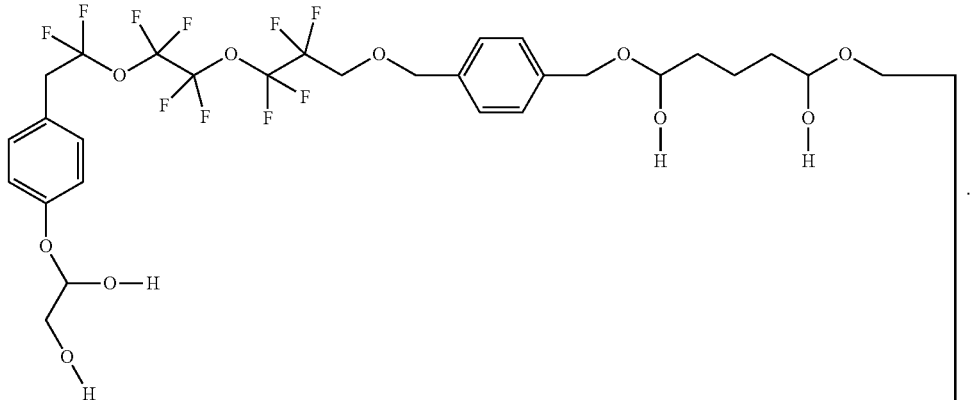
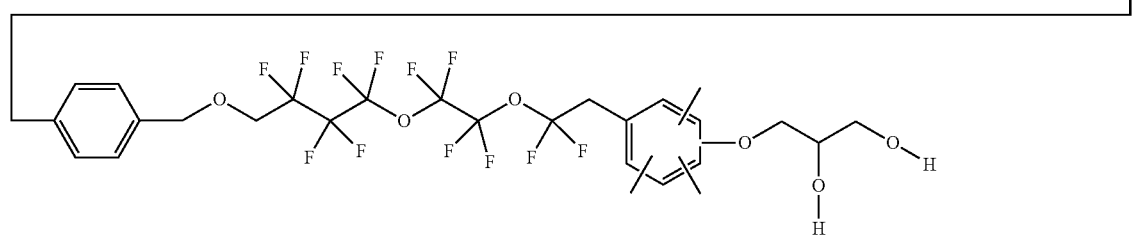
(XIII)

12. A lubricant comprising a plurality of segments according to general formula (I):

Rv¹-Rb¹—Re¹-Rc-Re²—Rb²-Rv² (I);

wherein Rc is a non-fluorinated linear divalent linking segment comprising at least one first anchoring functional group engageable with a protective overcoat of a magnetic recording medium;

wherein each Re¹ and Re² is an aromatic ring;

wherein each Rb¹ and Rb² independently comprises a chain segment comprising at least one of a fluoroalkyl ether moiety, a fluoroalkenyl ether moiety, a perfluoroalkyl ether moiety, a perfluoroalkenyl ether moiety, or a combination thereof;

wherein each of Rv¹ and Rv² independently comprises a moiety having at least one second anchoring functional group engageable with the protective overcoat of the magnetic recording medium, and wherein the lubricant is selected from the group consisting of formulas (VIII) through (XIII):

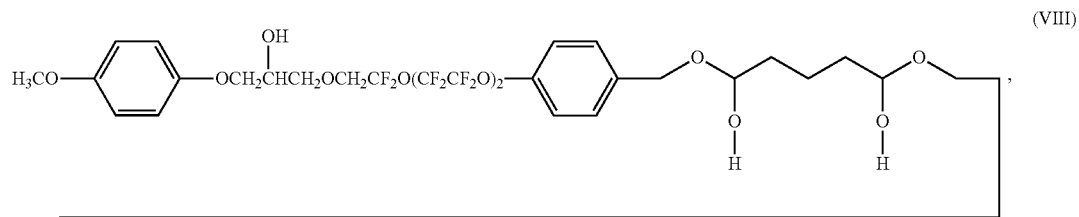

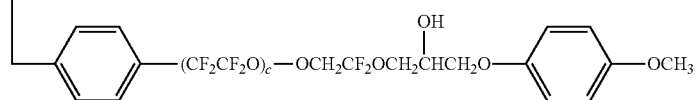

(VIII)

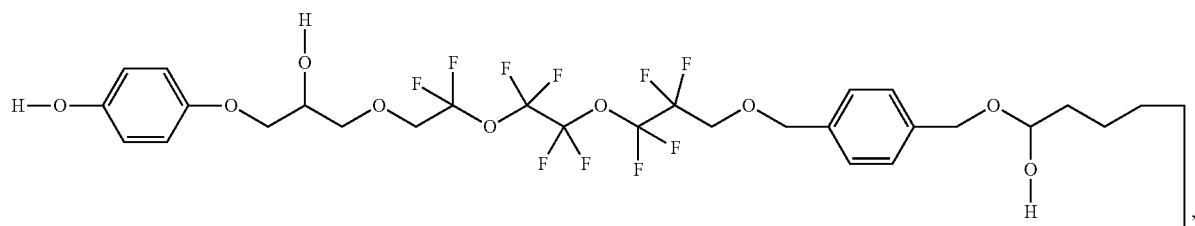

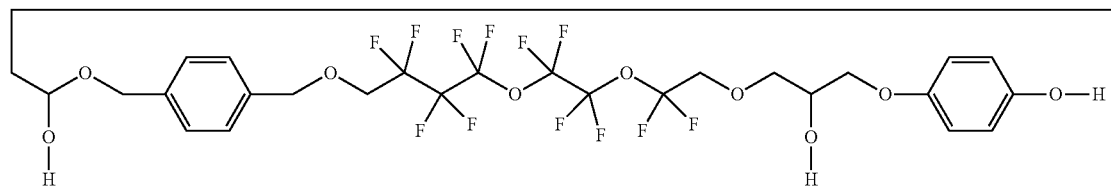

(IX)

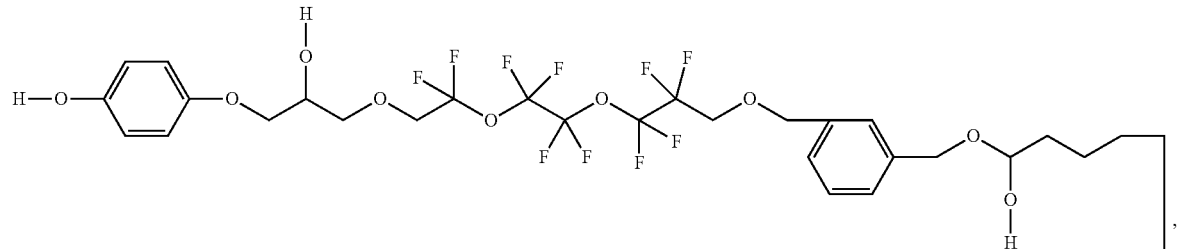
(X)
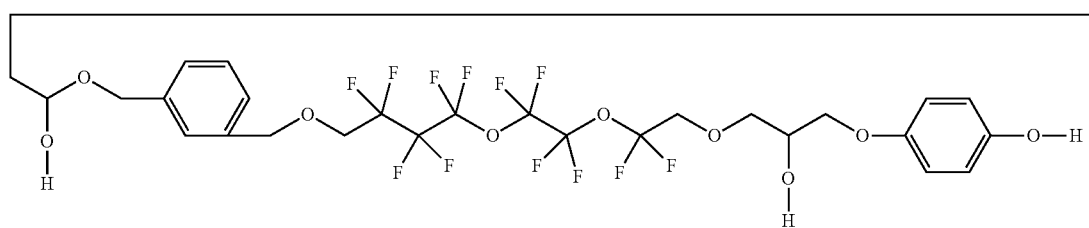
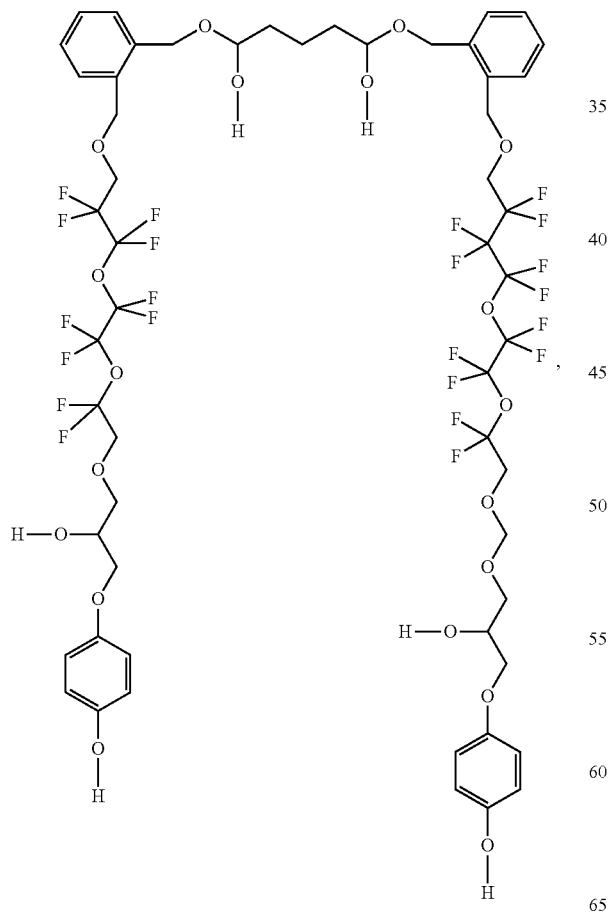
(XI)

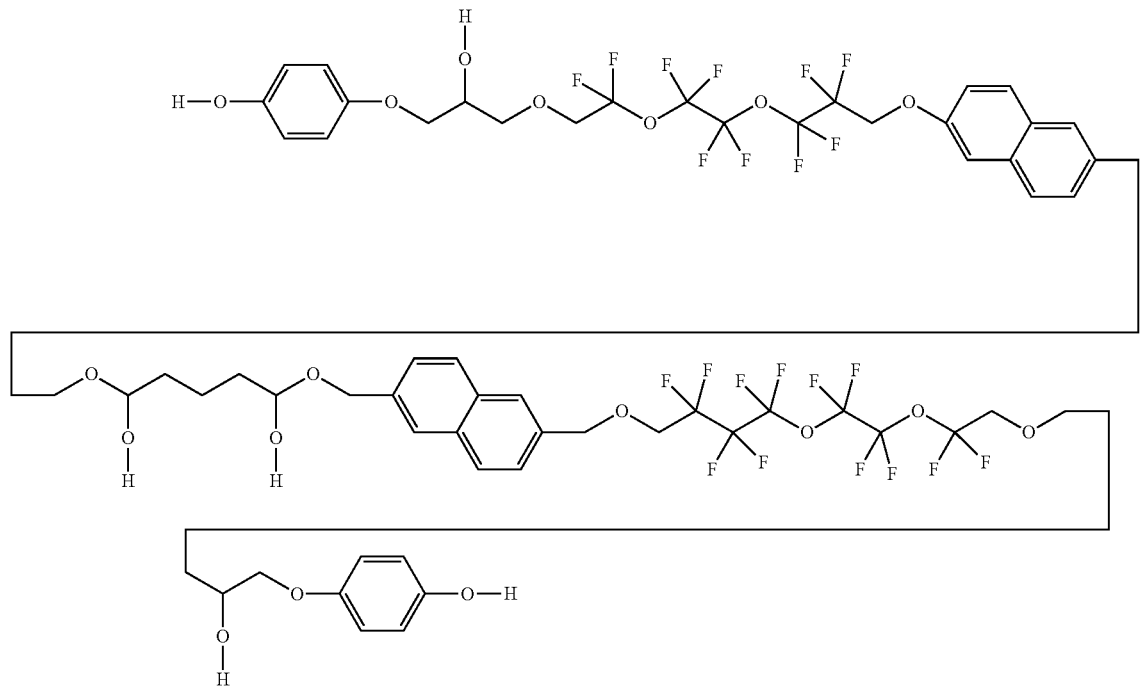
and
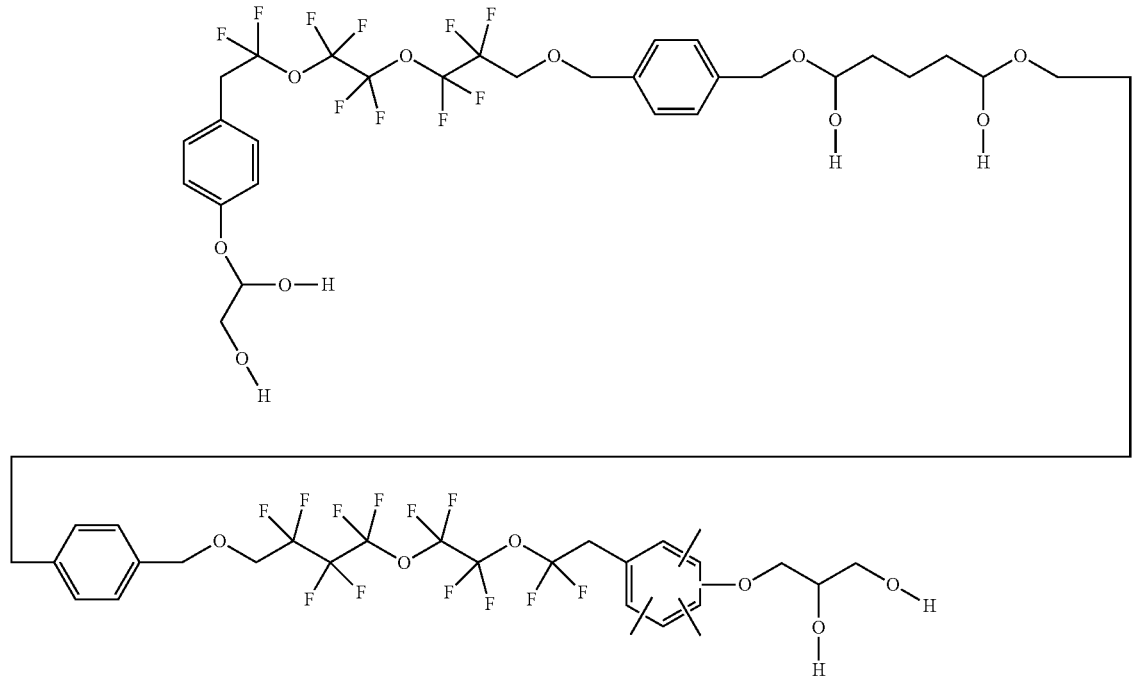

13. A magnetic recording medium, comprising:
a magnetic recording layer on a substrate;
a protective overcoat on the magnetic recording layer; and
a lubricant layer comprising the lubricant according to claim 12 on the protective overcoat.

14. The magnetic recording medium of claim 13, wherein the lubricant has a uniformity of about 0.2 to 0.3 Å at a lubricant thickness of between about 6 to 10 Å.

15. A data storage system, comprising:
at least one magnetic head;
a magnetic recording medium including the lubricant of claim 12;
a drive mechanism for positioning the at least one magnetic head over the magnetic recording medium; and
a controller electrically coupled to the at least one magnetic head for controlling operation of the at least one magnetic head.

16. A data storage system, comprising:
a slider comprising at least one magnetic head and an air bearing surface (ABS), wherein a lubricant according to claim 12 is disposed on the ABS; and
a magnetic recording medium including a magnetic recording layer;
wherein the slider is configured to write information to the magnetic recording layer using heat assisted magnetic recording (HAMR).

17. The lubricant of claim 12, having the formula (VIII):

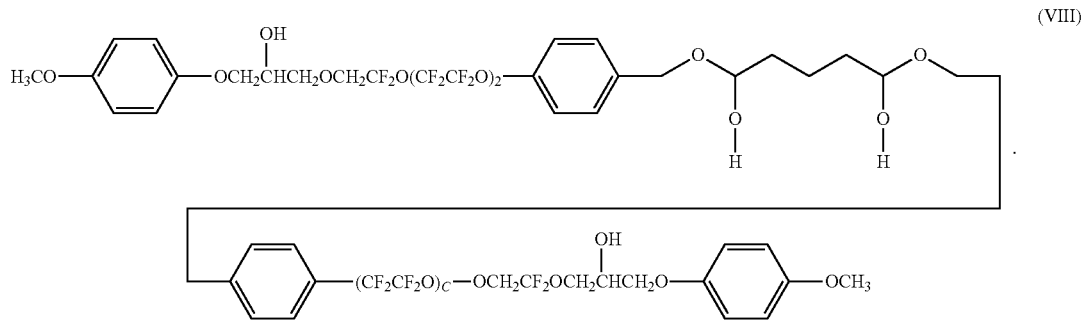

18. The lubricant of claim 12, having the formula (IX):

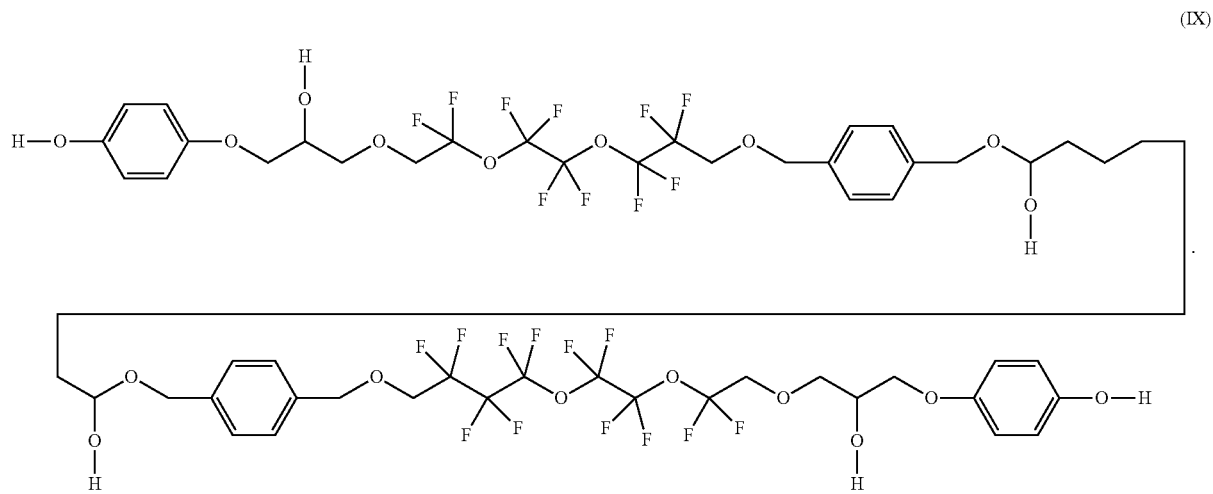 [SMILES: Oc1ccc(OCC(O)COCC(F)(F)OC(F)(F)C(F)(F)OC(F)(F)C(F)(F)COCc2ccc(COC(O)CCCCCCCC(O)OCc3ccc(COCC(F)(F)C(F)(F)C(F)(F)OC(F)(F)C(F)(F)OC(F)(F)COCC(O)COc4ccc(O)cc4)cc3)cc2)cc1]

19. The lubricant of claim 12, having the formula (X):
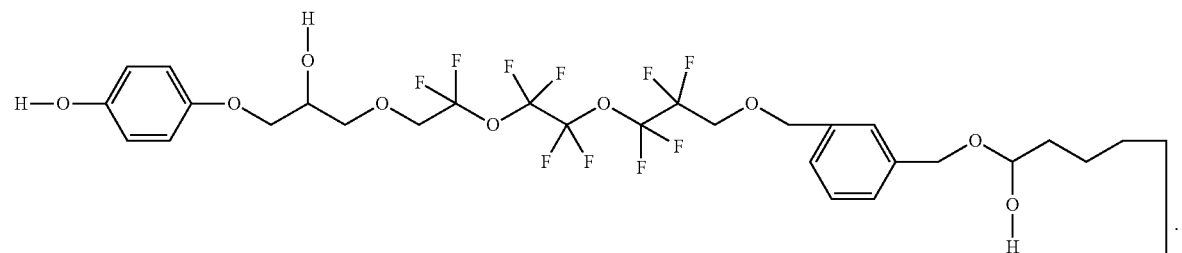
20. The lubricant of claim 12, having the formula (XI):
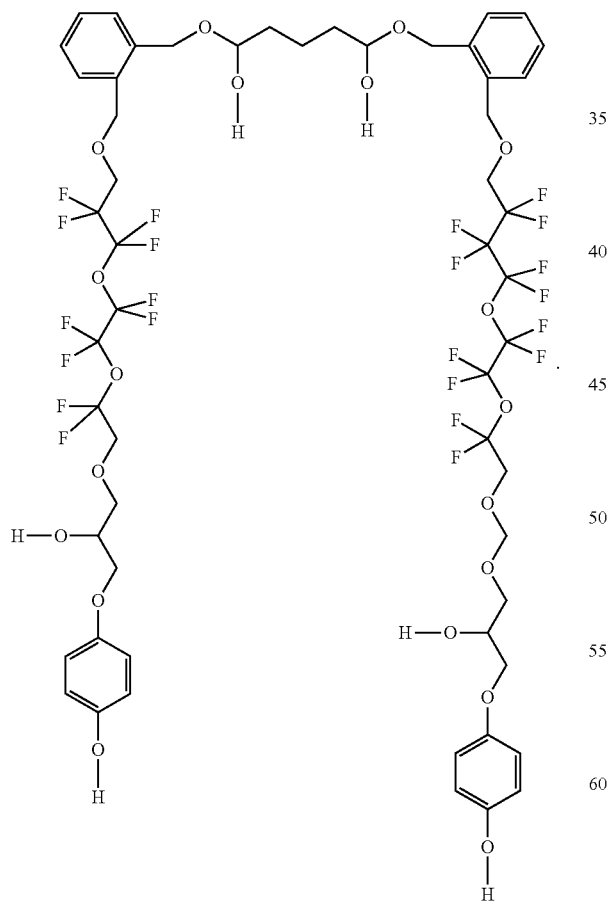
* * * * *